United States Patent
Jakubiak et al.

(10) Patent No.: US 9,569,065 B2
(45) Date of Patent: Feb. 14, 2017

(54) ELECTRONIC DEVICE INCLUDING PROJECTOR AND METHOD FOR CONTROLLING THE ELECTRONIC DEVICE

(71) Applicant: Samsung Electronics Co., Ltd., Suwon-si, Gyeonggi-do (KR)

(72) Inventors: Antoni Jakubiak, Warsaw (PL); Pawel Zborowski, Warsaw (PL); Adam Strupczewski, Warsaw (PL); Magda Talarek, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 14/152,238

(22) Filed: Jan. 10, 2014

(65) Prior Publication Data
US 2014/0298271 A1    Oct. 2, 2014

(30) Foreign Application Priority Data

Mar. 28, 2013 (KR) ........................ 10-2013-0033598

(51) Int. Cl.
*G06F 3/0481* (2013.01)
*G06F 3/0488* (2013.01)

(52) U.S. Cl.
CPC ......... *G06F 3/04812* (2013.01); *G06F 3/0488* (2013.01); *G06F 3/04883* (2013.01); *H04M 2250/22* (2013.01); *H04M 2250/54* (2013.01)

(58) Field of Classification Search
None
See application file for complete search history.

(56) References Cited

U.S. PATENT DOCUMENTS

| | | | |
|---|---|---|---|
| 7,239,305 B1 | 7/2007 | Nakano et al. | |
| 8,152,308 B2* | 4/2012 | Ahn ...................... | G06F 1/3203 345/173 |
| 2005/0120079 A1* | 6/2005 | Anderson .......... | H04L 29/06027 709/203 |
| 2005/0213593 A1* | 9/2005 | Anderson .......... | H04L 29/06027 370/419 |
| 2008/0018591 A1* | 1/2008 | Pittel .................... | G06F 1/1616 345/156 |
| 2009/0167700 A1* | 7/2009 | Westerman ........... | G06F 3/0485 345/173 |
| 2009/0178008 A1* | 7/2009 | Herz ................... | G06F 3/04817 715/840 |
| 2009/0184924 A1* | 7/2009 | Uchida .................. | G06F 3/038 345/157 |
| 2010/0099457 A1* | 4/2010 | Kim ..................... | G06F 1/1626 455/556.1 |
| 2010/0099464 A1 | 4/2010 | Kim | |

(Continued)

FOREIGN PATENT DOCUMENTS

EP  1 390 928 A1  2/2004
WO  02/069298 A1  9/2002

*Primary Examiner* — Phenuel Salomon
(74) *Attorney, Agent, or Firm* — Jefferson IP Law, LLP

(57) ABSTRACT

A method for controlling an electronic device that executes and displays an application is provided. The method includes displaying an execution screen of the application on a touch screen, projecting and displaying a projection image corresponding to the execution screen of the application, displaying a pointer on the projection image, and moving and displaying the pointer on the projection image to correspond to a gesture detected on the touch screen.

17 Claims, 22 Drawing Sheets

(56) References Cited

U.S. PATENT DOCUMENTS

| | | | |
|---|---|---|---|
| 2010/0105428 A1* | 4/2010 | Kim | G03B 21/14 |
| | | | 455/556.1 |
| 2010/0188428 A1* | 7/2010 | Shin | G06F 1/1639 |
| | | | 345/661 |
| 2010/0197361 A1 | 8/2010 | Choi et al. | |
| 2011/0039606 A1* | 2/2011 | Kim | H04M 1/72522 |
| | | | 455/574 |
| 2011/0070920 A1* | 3/2011 | Saied | H04M 1/0272 |
| | | | 455/552.1 |
| 2011/0102599 A1 | 5/2011 | Kwon et al. | |
| 2011/0148789 A1* | 6/2011 | Kim | G03B 17/54 |
| | | | 345/173 |
| 2011/0151926 A1 | 6/2011 | Kim et al. | |
| 2011/0199326 A1 | 8/2011 | Takano | |
| 2014/0223132 A1* | 8/2014 | Yoshida | G06F 12/0223 |
| | | | 711/170 |

* cited by examiner

ELECTRONIC DEVICE INCLUDING PROJECTOR AND METHOD FOR CONTROLLING THE ELECTRONIC DEVICE

PRIORITY

This application claims the benefit under 35 U.S.C. §119(a) of a Korean patent application filed on Mar. 28, 2013 in the Korean Intellectual Property Office and assigned Serial No. 10-2013-0033598, the entire disclosure of which is hereby incorporated by reference.

BACKGROUND OF THE INVENTION

1. Field of the Invention

The present invention relates to an electronic device including a projector and a method for controlling the electronic device. More particularly, the present invention relates to an electronic device for displaying a rendered screen on a screen of the electronic device or for projecting and displaying the rendered screen through a projector and a method for controlling the electronic device.

2. Description of the Related Art

Recently, smart phones or tablet Personal Computers (PCs) have become popular among consumers. As a result, applications using the smart phones or the tablet PCs are being actively developed. According to the related art, the smart phones or the tablet PCs typically include touch screens, and users may manipulate the smart phones or the tablet PCs by inputting a predetermined gesture onto the touch screens.

However, the smart phones or the tablet PCs emphasize portability, and thus the size of the touch screen of the smart phone or the tablet PC is limited. In particular, when the user desires to view a moving image or a still image by using the smart phone or the tablet PC, the user may experience a difficulty in viewing the moving image or the still image due to the limited-size touch screen.

According to the related art, a smart phone or tablet PC may project and display an image onto a screen by using a projector module. The user views the projected image rather than viewing the image displayed on the limited-size touch screen.

According to the related art, in order to input a particular command, the user inputs a particular gesture onto the touch screen. For example, the user needs to input the particular gesture while observing the touch screen, but cannot check this process on a projected image. For example, because the user-input gesture is input using a hand or a stylus pen and a smart phone or tablet PC according to the related art does not display a position of the hand or stylus pen on the touch screen, the user is unable to check (e.g., confirm) the desired input to the touch screen. The smart phone or tablet PC merely projects and displays rendered data and cannot project and display a gesture that the user physically inputs onto the touch screen.

Therefore, a need exists for a technique which allows a user to easily manipulate a smart phone or a tablet PC while observing a projected image.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, aspects of the present invention provide an electronic device including a projector which adds a pointer corresponding to a gesture sensed on a touch screen to and display the pointer on a projected image and a method for controlling the electronic device.

In accordance with an aspect of the present invention, a method for controlling an electronic device that executes and displays an application is provide. The method includes displaying an execution screen of the application on a touch screen, projecting a projection image corresponding to the execution screen of the application, displaying a pointer on the projection image, and moving and displaying the pointer on the projection image to correspond to a gesture detected on the touch screen.

In accordance with another aspect of the present invention, an electronic device is provided. The electronic device includes a touch screen for displaying an execution screen of an application, a projector module for projecting and displaying a projection image corresponding to the execution screen of the application, and a controller for displaying a pointer on the projection image, and for moving and displaying the pointer on the projection image to correspond to a gesture detected on the touch screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

As a non-exhaustive illustration only, a device (e.g., electronic device) described herein may refer to mobile devices such as a cellular phone, a Personal Digital Assistant (PDA), a digital camera, a portable game console, and an digital audio player, a Portable/Personal Multimedia Player (PMP), a handheld e-book, a portable lap-top Personal Computer (PC), a Global Positioning System (GPS) navigation, and the like capable of wireless communication or network communication consistent with that disclosed herein.

Figure 1:
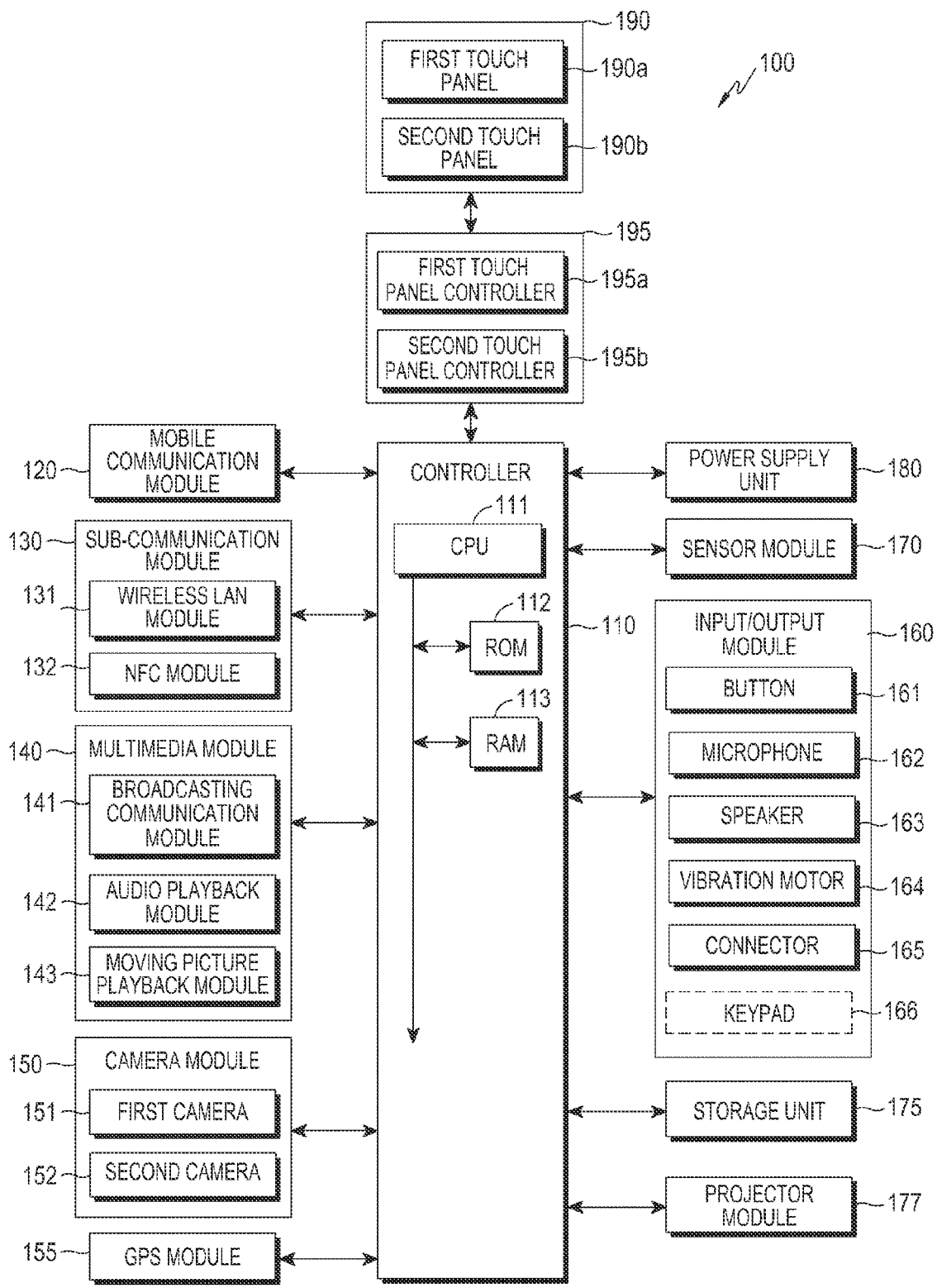
FIG. 1 is a schematic block diagram illustrating an electronic device according to an exemplary embodiment of the present invention.

FIG. 1 is a schematic block diagram illustrating an electronic device according to an exemplary embodiment of the present invention.

Referring to FIG. 1, an electronic device 100 may be connected with an external device (not illustrated) by using a mobile communication module 120, a sub communication module 130, and a connector 165. The "external device" may include another device (not illustrated), a cellular phone (not illustrated), a smart phone (not illustrated), a tablet PC (not illustrated), a server (not illustrated), and the like.

The electronic device 100 may include a controller 110, a mobile communication module 120, a sub communication module 130, a multimedia module 140, a camera module 150, a GPS module 155, an input/output module 160, a sensor module 170, a storage unit 175, a power supply unit 180, a touch screen 190 and a touch screen controller 195.

The sub communication module 130 may include at least one of a Wireless Local Area Network (WLAN) module 131 and a short-range communication module 132 (e.g., a Near Field Communications (NFC) module).

The multimedia module 140 may include at least one of a broadcast communication module 141, an audio playback module 142, and a video playback module 143.

The camera module 150 may include at least one of a first camera 151 and a second camera 152.

The input/output module 160 may include at least one of a button 161, a microphone 162, a speaker 163, a vibration motor 164, a connector 165, and a keypad 166.

The controller 110 may include a Central Processing Unit (CPU) 111, a Read Only Memory (ROM) 112 in which a control program for controlling the electronic device 100 may be stored, and a Random Access Memory (RAM) 113 which stores a signal or data input from the electronic device 100 or which is used as a memory region for a task performed in the electronic device 100. The CPU 111 may include a various number of core processors (e.g., the CPU may include a single core, a dual core, a triple core, a quad core processor). The CPU 111, the ROM 112, and the RAM 113 may be interconnected through an internal bus.

The controller 110 controls the mobile communication module 120, the multimedia module 140, the camera module 150, the GPS module 155, the input/output module 160, the sensor module 170, the storing unit 175, the power supply unit 180, the touch screen 190, and the touch screen controller 195.

The mobile communication module 120 enables the electronic device 100 to be connected with an external device through mobile communication by using at least one antenna or plural-antennas (not illustrated) under control of the controller 110. The mobile communication module 120 transmits/receives a wireless signal for voice call, video call, a text message (e.g., Short Messaging Service (SMS)), a multimedia message (e.g., Multi Media Service (MMS)), and the like with a cellular phone (not illustrated), a smart phone (not illustrated), a tablet PC, or another electronic device (not illustrated) which has a phone number input to the electronic device 100.

The sub communication module 130 may include at least one of the WLAN module 131 and the short-range communication module 132. For example, the sub communication module 130 may include either the WLAN module 131 or the short-range communication module 132 or both of the WLAN module 131 and the short-range communication module 132.

The WLAN module 131 may be connected to the Internet through a wireless Access Point (AP) (not illustrated) under control of the controller 110. The WLAN module 131 supports the WLAN standard IEEE802.11x of the Institute of Electrical and Electronics Engineers (IEEE). The short-range communication module 132 may wirelessly perform short-range communication between the electronic device 100 and an image forming apparatus (not illustrated) under control of the controller 110. The short-range communication may include Bluetooth, Infrared Data Association (IrDA), or the like.

The electronic device 100 may include at least one of the mobile communication module 120, the WLAN module 131, and the short-range communication module 132. For example, the electronic device 100 may include a combination of the mobile communication module 120, the WLAN module 131, and the short-range communication module 132.

The multimedia module 140 may include the broadcast communication module 141, the audio playback module 142, or the video playback module 143. The broadcast communication module 141 receives a broadcast signal (e.g., a TV broadcast signal, a radio broadcast signal, a data broadcast signal, and the like) and broadcast additional information (e.g., Electric Program Guide (EPG), Electric Service Guide (ESG), and the like) transmitted from a broadcasting station (not shown) via a broadcast communication antenna (not illustrated) under control of the controller 110. The audio playback module 142 may play a digital audio file (e.g., a file having a file extension such as 'mp3', 'wma', 'ogg', 'wav', and the like) stored or received under control of the controller 110. The video playback module 143 may play a digital video file (e.g., a file having a file extension such as 'mpeg', 'mpg', 'mp4', 'avi', 'mov', 'mkv', and the like) stored or received under control of the controller 110. The video playback module 143 may also play a digital audio file.

The multimedia module 140 may include the audio playback module 142 and the video playback module 143, except for the broadcast communication module 141. According to exemplary embodiments of the present invention, the audio playback module 142 and/or the video playback module 143 of the multimedia module 140 may be included in the controller 100.

The camera module 150 may include at least one of the first camera 151 and the second camera 152 which capture a still image or a video under control of the controller 110. The first camera 151 or the second camera 152 may include an auxiliary light source (e.g., a flash (not illustrated)) which provides light of an amount necessary for photographing. According to an exemplary embodiment of the present invention, first camera 151 may be positioned on the front surface of the electronic device 100, and the second camera 152 may be positioned on the rear surface of the electronic device 100. According to another exemplary embodiment of the present invention, the first camera 151 and the second camera 152 may be positioned adjacent to each other (e.g., a space between the first camera 151 and the second camera 152 is greater than 1 cm and less than 8 cm) to capture a 3-Dimensional (3D) still image or a 3D moving image.

The GPS module 155 receives electric waves from a plurality of GPS satellites (not illustrated) in the Earth's orbit, and calculates a location of the electronic device 100 by using a time of arrival from the GPS satellite (not illustrated) to the electronic device 100.

The input/output module 160 may include at least one of the button 161, the microphone 162, the speaker 163, the vibration motor 164, the connector 165, and the keypad 166.

The button 161 may be formed on at least one of a front surface, a side surface, and a rear surface of a housing (or case) of the electronic device 100, and may include at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals (e.g., wireless data, broadcast data, a digital audio file, a digital video file, a captured image, or the like) of the mobile communication module 120, the sub communication module 130, the multimedia module 140, or the camera module 150 to the outside of the electronic device 100 under control of the controller 110. The speaker 163 may output sound corresponding to a function executed by the electronic device 100 (e.g., button manipulation sound corresponding to a phone call or a ring back tone). One or more speakers 163 may be formed in a proper position or proper positions of a housing of the electronic device 100.

The vibration motor 164 may convert an electrical signal into mechanical vibration under control of the controller 110. For example, when the electronic device 100 in a vibration mode receives a voice call from another device (not illustrated), the vibration motor operates. A single vibration motor or multiple vibration motors may be formed in the housing of the electronic device 100. The vibration motor may operate in response to a user's touch on the touch screen 190 and continuous movement of the touch on the touch screen 190.

The connector 165 may be used as an interface for connecting the electronic device 100 with an external device (not illustrated) or a power source (not illustrated). Under control of the controller 110, through a wired cable connected to the connector 165, data stored in the storing unit 175 of the electronic device 100 may be transmitted to the external device (not illustrated) or data may be received from the external device (not illustrated). For example, through the wired cable connected to the connector 165, power may be input from the power source (not illustrated) or a battery (not illustrated) may be charged.

The keypad 166 may receive a key input from the user for control of the electronic device 100. The keypad 166 may include a physical keypad (not illustrated) formed in the electronic device 100 or a virtual keypad (not illustrated) displayed on the touch screen 190. The physical keypad (not illustrated) formed in the electronic device 100 may be excluded depending on the performance or structure of the electronic device 100.

The sensor module 170 may include at least one sensor for detecting a state of the electronic device 100. For example, the sensor module 170 may include a proximity sensor for detecting user's proximity to the electronic device 100, an illumination sensor (not illustrated) for detecting an amount of light around the electronic device 100, or a motion sensor (not illustrated), such as a geo-magnetic sensor or an acceleration sensor, for detecting a motion of the electronic device 100 (e.g., a rotation of the electronic device 100, or an acceleration or a vibration applied to the electronic device 100). The at least one sensor may detect a state of the electronic device 100, generate a signal corresponding to detection, and transmit the generated signal to the controller 110. The at least one sensor of the sensor module 170 may be added or removed according to implementation of the electronic device 100.

The storage unit 175 stores a signal or data which is input/output corresponding to operations of the mobile communication module 120, the sub communication module 130, the multimedia module 140, the camera module 150, the GPS module 155, the input/output module 160, the sensor module 170, or the touch screen 190, under control of the controller 110. The storage unit 175 may also store a control program and applications for control of the electronic device 100 and/or the controller 110.

The term "storage unit" may include the storage unit 175, the ROM 112 and the RAM 113 in the controller 110, a memory card (not illustrated) mounted in the portable terminal 100 (e.g., a Secure Digital (SD) card, a memory stick), and the like. The storage unit 175 may include a non-volatile memory, a volatile memory, a Hard Disk Drive (HDD), a Solid State Drive (SSD), and the like.

A projector module 177 projects and displays a rendered image. For example, the projector module 177 may include a light source for emitting light to be used in projection, a light-modulator for modulating light incident from the light source according to an image signal, and a lens unit for projecting the light incident from the light-modulator onto a screen.

The power supply unit 180 may supply power to at least one battery (not illustrated) disposed in the housing of the electronic device 100 under control of the controller 110. The at least one batter (not illustrated) supplies power to the electronic device 100. The power supply unit 180 may supply power input from an external power source (not illustrated) through a wired cable connected with the connector 165 to the electronic device 100.

The touch screen 190 may provide a user interface corresponding to various services (e.g., call, data transmission, broadcasting, picture/moving image capturing, and the like) to the user. The touch screen 190 may transmit an analog signal corresponding to at least one touch input to the user interface to the touch screen controller 195. The touch screen 190 may sense (e.g., detect) at least one touch through a user's body (e.g., a finger including a thumb) or a touch-possible input means (e.g., a stylus pen). The touch screen 190 may sense (e.g., detect) continuous movement of one of the at least one touch. The touch screen 190 may transmit an analog signal corresponding to continuous movement of the sensed (e.g., detected) touch to the touch screen controller 195.

According to exemplary embodiments of the present invention, the touch may include a contactless (e.g., a detectable distance between the touch screen 190 and the user's body or the touch-possible input means) touch as well as a contact between the touch screen 190 and the user's body or the touch-possible input means. In the touch screen 190, the detectable distance may vary depending on the performance or structure of the electronic device 100.

The touch screen 190 may include, for example, a first touch panel 190a and a second touch panel 190b. The first touch panel 190a may measure a touch or approach of a part of the user's body. For example, the first touch panel 190a may be of a resistive type, a capacitive type, an infrared type, an acoustic wave type, or the like.

The second touch panel 190b may measure a touch or approach of a device such as a stylus pen. For example, the second touch panel 190b may be of an Electromagnetic Resonance (EMR) measurement type.

The touch screen controller 195 converts an analog signal received from the touch screen 10 into a digital signal (e.g., X and Y coordinates) for transmission to the controller 110. The controller 110 then controls the touch screen 190 by using the digital signal received from the touch screen controller 195. For example, the controller 110 may select or execute a shortcut icon (not illustrated) displayed on the touch screen 190 in response to a touch. According to exemplary embodiments of the present invention, touch screen controller 195 may be included in the controller 110. The touch screen controller 195 may include a first touch panel controller 195a for controlling the first touch panel 190a and a second touch panel controller 195b for controlling the second touch panel 190b.

The controller 110 detects various user inputs received through the camera module 150, the input/output module 160, the sensor module 170, and the touch screen 190. The user inputs may include not only touches, but also various forms of information input to the electronic device 100, such as user's gesture, voice, eye movement, and biomedical signal. The controller 110 may control the overall operation of the electronic device 100 to perform a predetermined operation or function corresponding to the detected user input.

Figure 2:
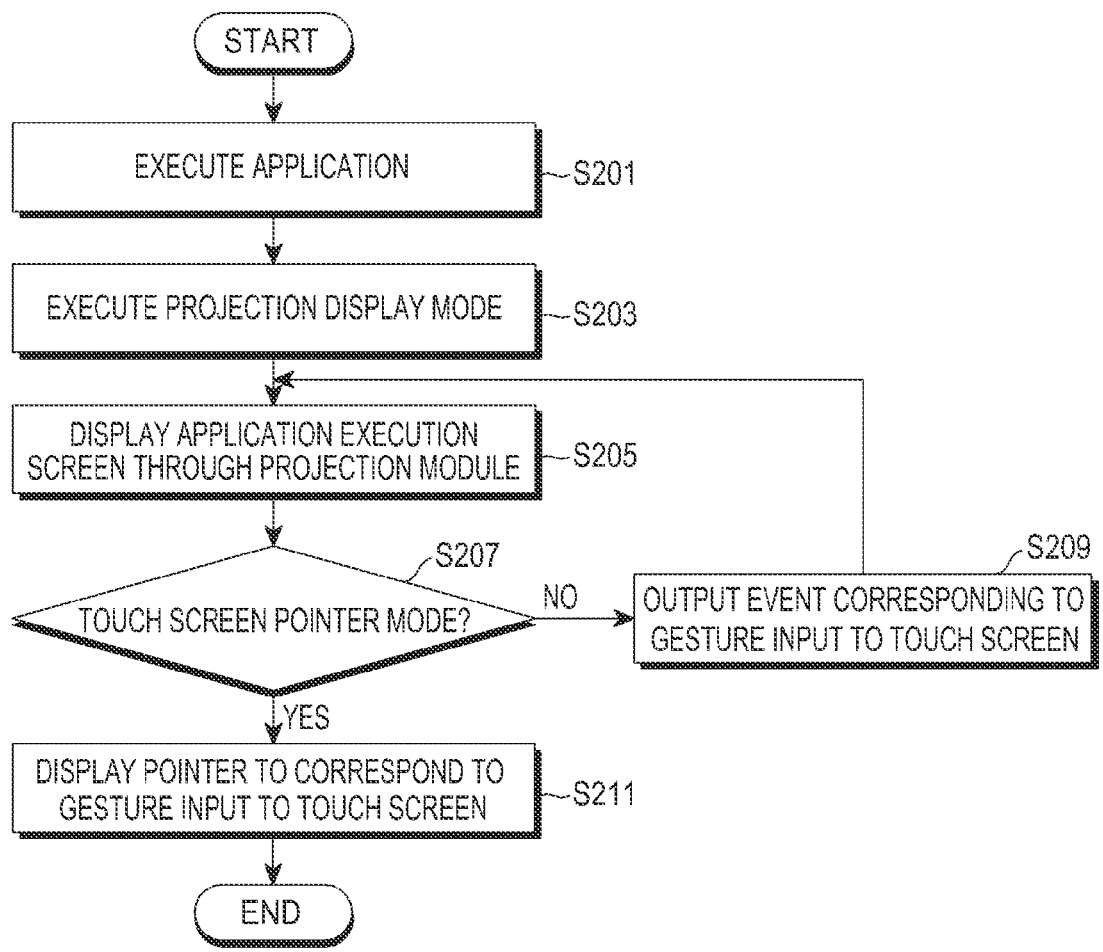
FIG. 2 is a flowchart illustrating a method for controlling an electronic device including a projector module according to an exemplary embodiment of the present invention.
Figure 10:
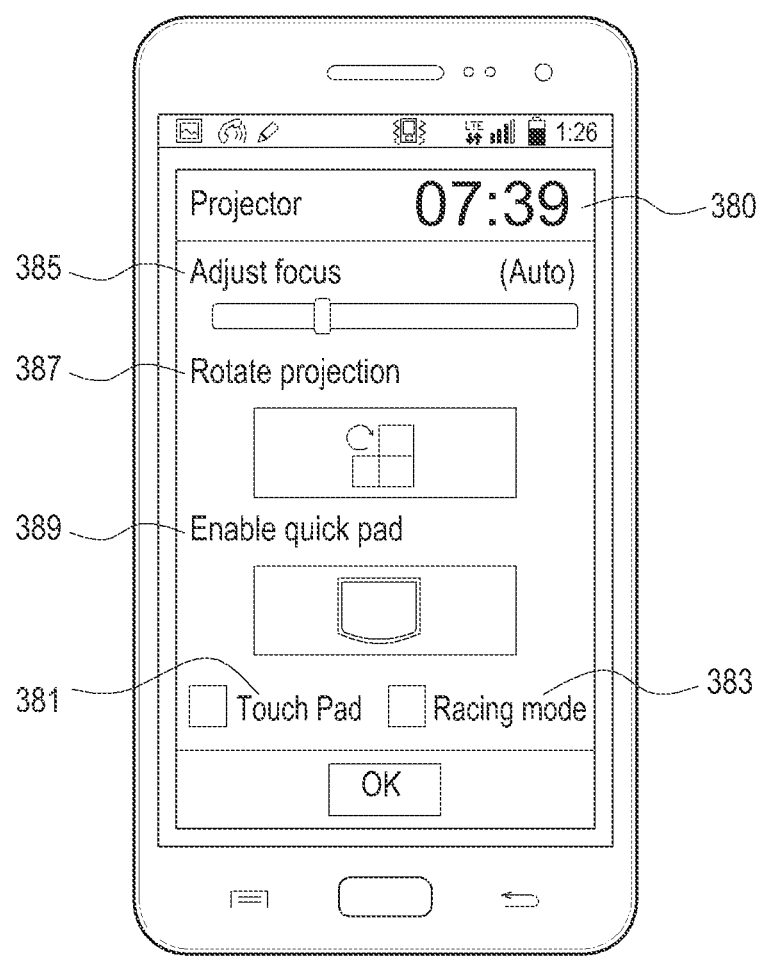
FIG. 10 is a screen illustrating an electronic device's touch screen according to exemplary embodiment of the invention.

FIG. 2 is a flowchart illustrating a method for controlling an electronic device including projector module according to an exemplary embodiment of the present invention. FIGS. 3A through 3I are conceptual diagrams illustrating an electronic device according to exemplary embodiments of the present invention. FIG. 10 is a screen illustrating an electronic device's touch screen according to exemplary embodiment of the invention.

The control method illustrated in FIG. 2 will be described in more detail with reference to FIGS. 3A through 3I.

Figure 3A:
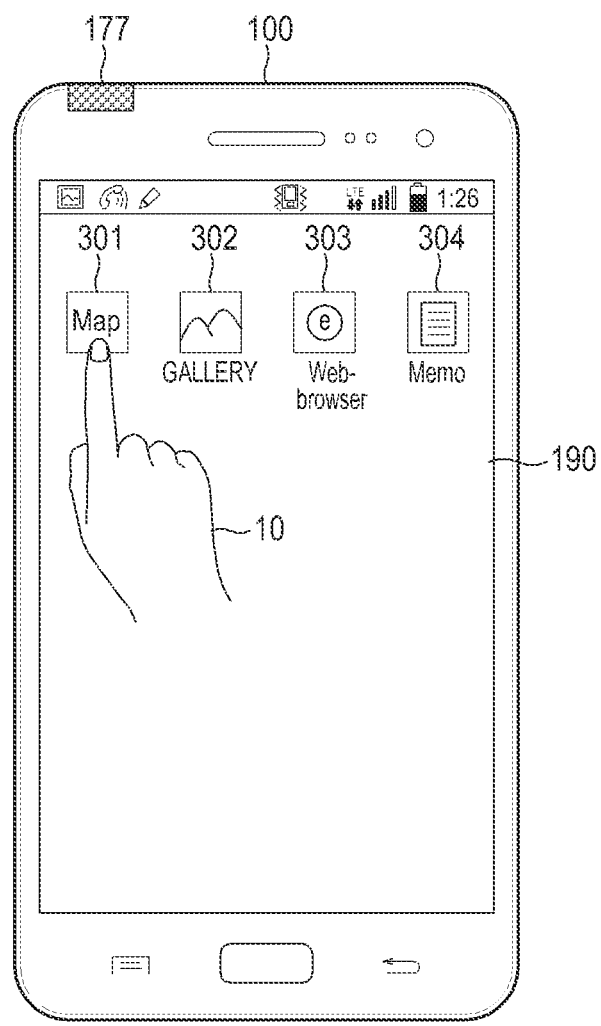
FIGS. 3A through 3I are conceptual diagrams illustrating an electronic device according to exemplary embodiments of the present invention.

Referring to FIGS. 2 and 3A through 3I, in step S201, the electronic device 100 executes and displays an application. For example, as illustrated in FIG. 3A, the electronic device 100 including the projector module 177 may display a launcher application on the touch screen 190. The launcher application displays icons 301, 302, 303, and 304 corresponding to applications installed on the electronic device 100 on the touch screen 190. A user 10 selects a map application icon 301 which corresponds to one of the icons 301, 302, 303, and 304 displayed on the launcher application. According to exemplary embodiments of the present invention such as the example illustrated in FIG. 3A, the user 10 inputs a gesture of touching the map application icon 301 by using a part of the body (e.g., a finger), to execute the application. As an example, the user 10 may also select the map application icon 301 by using a coordinate designating device such as a stylus pen. The user 10 may also select the map application icon 301 by inputting various gestures as well as the touch gesture. An application execution method may be easily changed and carried out, and an artisan will understand and appreciate that the scope of the present invention is not limited by the application execution method.

Figure 3B:
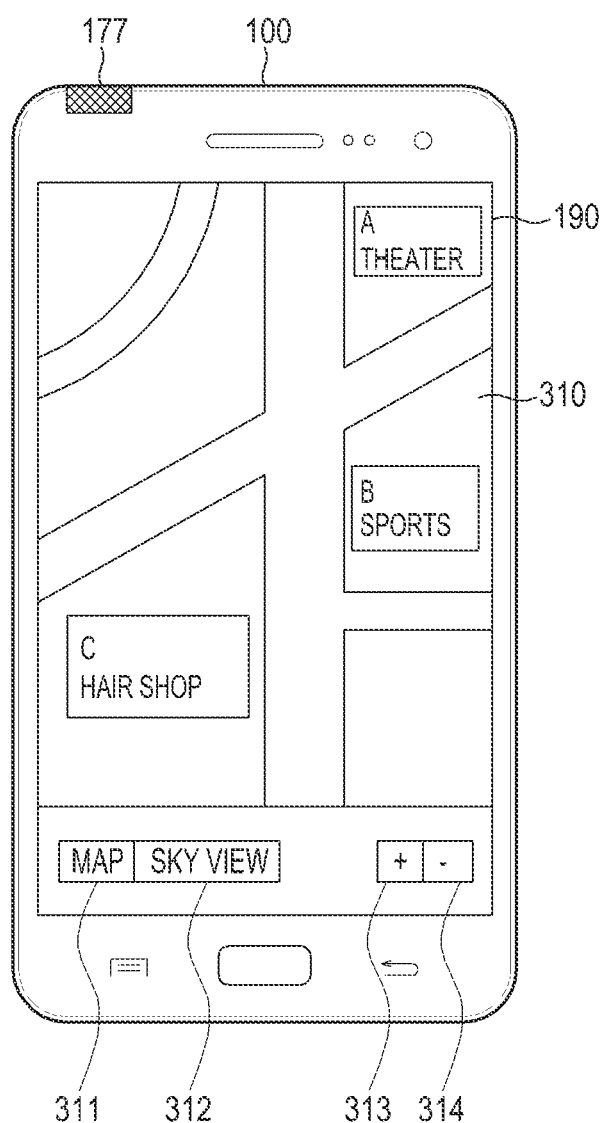

The controller 110 executes an application and display an application execution screen 310 as illustrated in FIG. 3B. The application execution screen 310 corresponding to the map application may include a map indicating positions of "A Theater", "B Sports", and "C Hair shop" and a street nearby and a plurality of function keys 311, 312, 313, and 314. For example, the first function key 311 may be a function key for displaying a map, the second function key 312 may be a function key for displaying an aerial photograph, the third function key 313 may be a function key for enlarging the map, and the fourth function key 314 may be a function key for reducing the map.

Referring to FIG. 2, in step S203, the electronic device 100 executes a projection display mode.

Figure 3C:
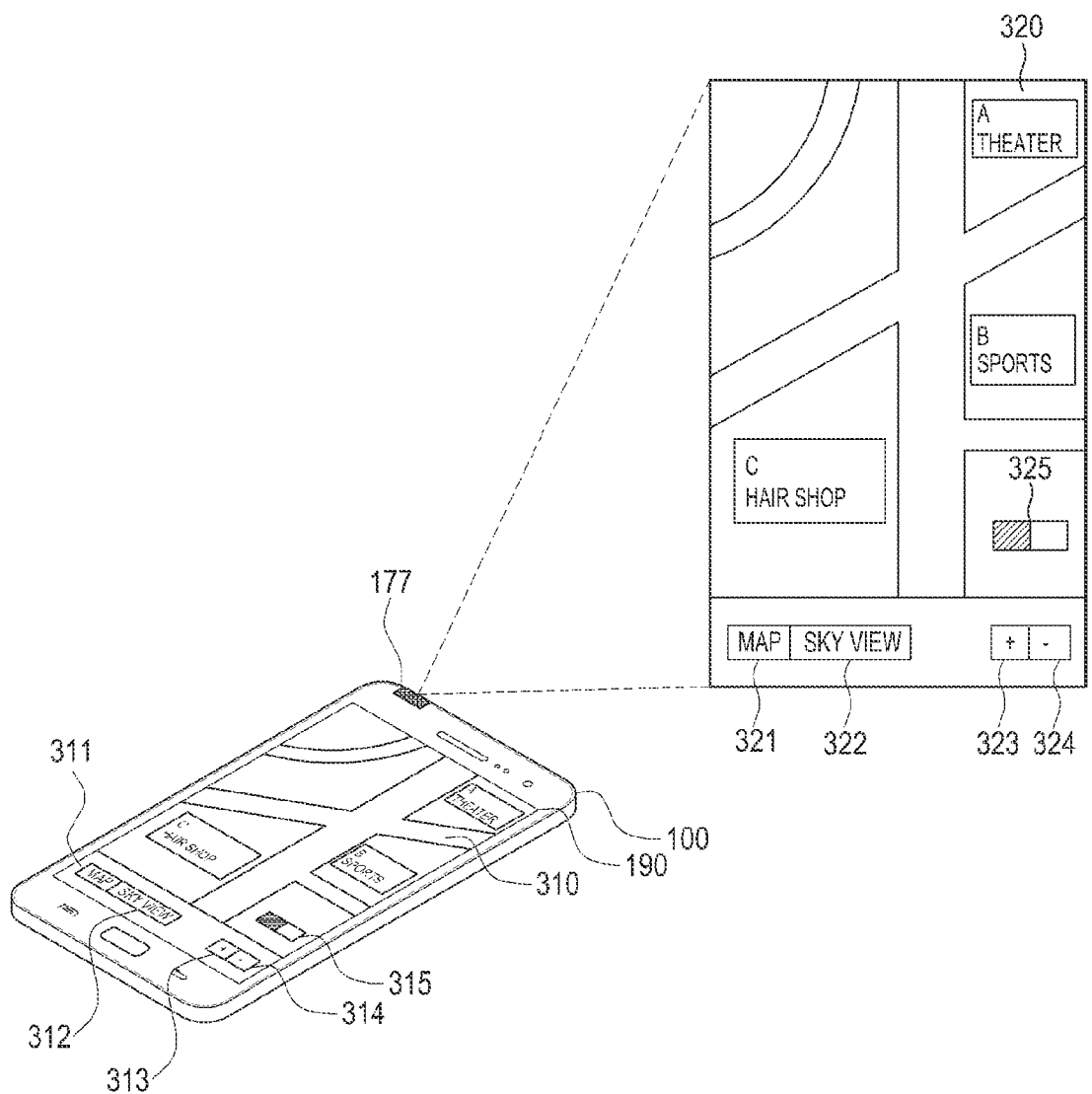

In step S205, projects and displays an application execution screen through the projector module 177. For example, as illustrated in FIG. 3C, the controller 110 controls the projector module 177 to project the same image as the application execution screen 310 displayed on the touch screen 190. The projector module 177 generates and projects a projection image 320 which is the same as the application execution screen 310. The projection image 320 includes first through fourth projection function keys 321 through 324 corresponding to the first through fourth function keys 311 through 314.

Once when the electronic device 100 executes the projection display mode in step S203, the controller 110 controls to display the screen including a check box to select one of a normal mode and a touch screen pointer mode on the application execution screen 310. The normal mode may be a mode for dispatching a gesture sensed (e.g., detected) on the touch screen 190 to the application. Moreover, the touch screen pointer mode may be a mode for using the gesture sensed on the touch screen 190 for movement of the pointer on the projection image 320, instead of dispatching the sensed gesture to the application. Referring to FIG. 10, projector setting screen 380 includes a check box to select a touch pad 381 and a racing mode 383. Also, a projector setting screen 380 includes a adjust focus menu 385 and a rotate projection menu 387 and a enable quick pad menu 389. The check box to select a touch pad 381 is for switching between the normal mode and the touch screen pointer mode. Also, the check box to select a racing mode 383 is for activating a new mode dedicated for racing games. Also, the adjust focus menu 385 is for adjusting the focus, and the adjust focus menu 385 includes a scroll bar and a auto menu. Additionally, the check box to an auto focus mode is for activating an auto focus function. Also, the rotate projection menu 387 is for selecting landscape or portrait projection mode. Also, enable quick pad 389 is for activating a presentation mode.

Also the electronic device 100 executes the projection display mode in step S203, the controller 110 displays a toggling switch 315 for determining (e.g., for selecting) one of a normal mode and a touch screen pointer mode (or a touch screen pointer mode) on the application execution screen 310.

In step S207, the controller 110 determines whether the electronic device 100 is operating the normal mode or the touch screen pointer mode. For example, in FIG. 3C, if the toggling switch 315 is set to be positioned to the left, the controller 110 may set the normal mode; if the toggling switch 315 is set to be positioned to the right, the controller 110 may set the touch screen pointer mode. For example, in step S207, the controller 110 determines whether the electronic device 100 is operating in a touch screen pointer mode.

If the controller 110 determines that the electronic device 100 is not operating in the touch screen pointer mode in step S207, then the controller 110 proceeds to step S209 in which the controller 110 operatively outputs an event corresponding to a gesture input to the touch screen 190. Thereafter, the controller 110 proceeds to step S205.

Figure 3D:
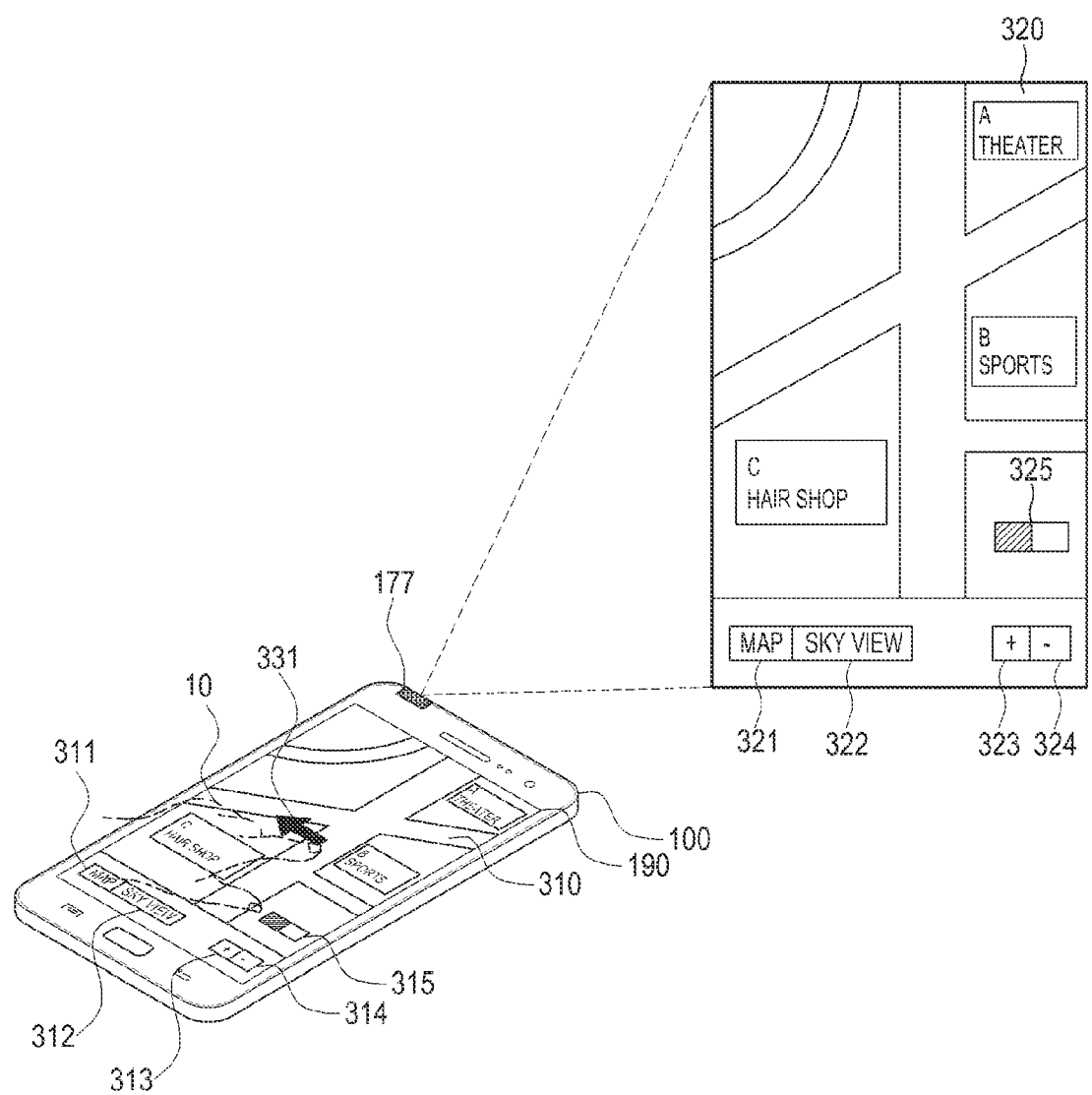

For example, as illustrated in FIG. 3C, the toggling switch 315 is set to be positioned to the left and thus the normal mode is set. Hence, if the user 10 inputs a leftward continuous touch gesture (or drag gesture) 331 as illustrated in FIG. 3D, the controller 110 may send the continuous touch gesture 331 sensed (e.g., detected) on the touch screen 190 to the map application.

Figure 3E:
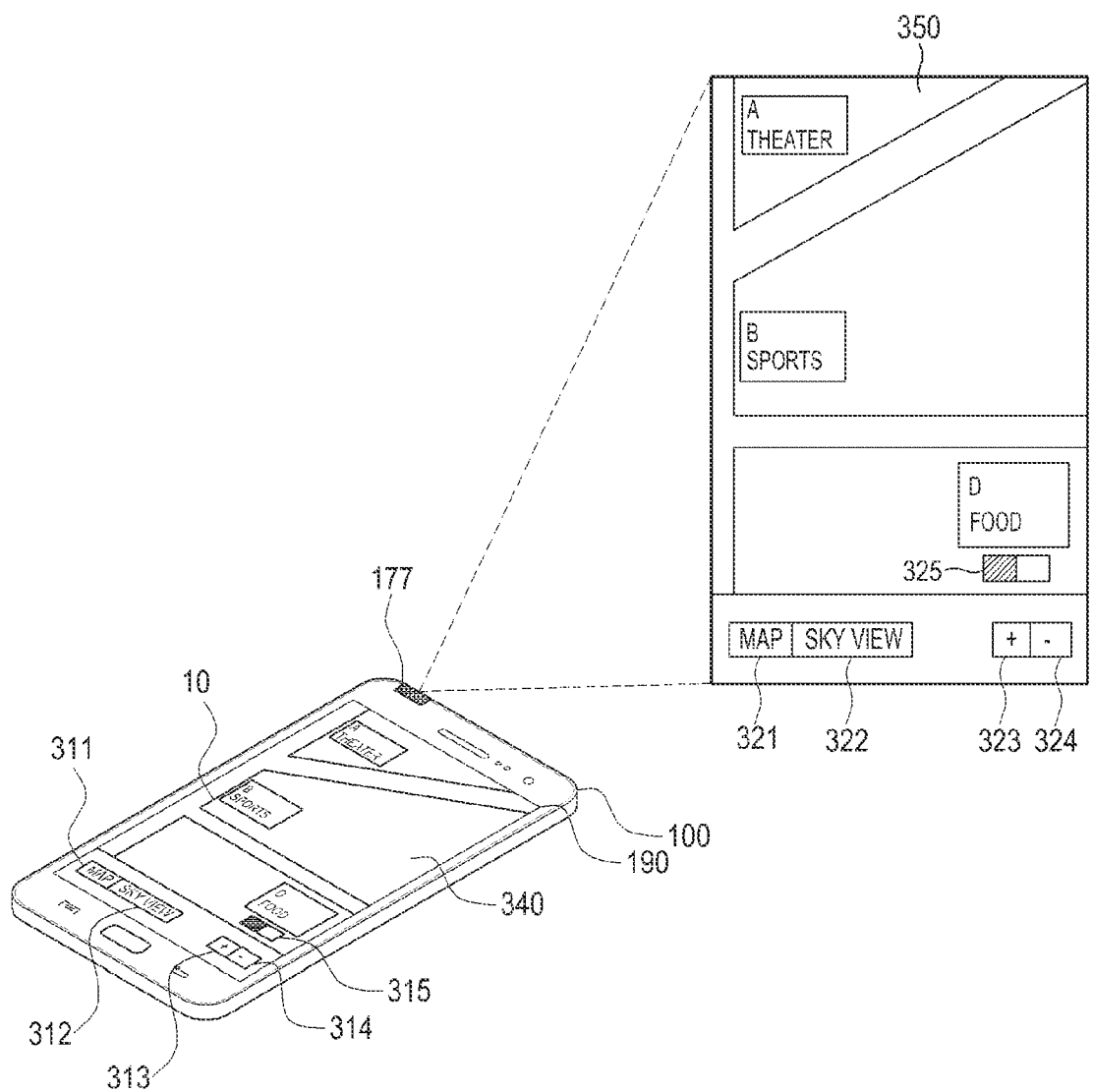

If the leftward continuous touch gesture 331 is sensed, the map application may be set to output a map corresponding to a region located to the right of the currently displayed region (e.g., the map may operatively pan left). As illustrated in FIG. 3E, the controller 110 displays an application execution screen 340 including the map corresponding to the right region, which is the output of the map application. The application execution screen 340 includes "A Theater", "B Sports", and "D Food" and geographical features of a street nearby. In particular, "A Theater" and "B Sports" displayed to the right on the application execution screen 320 are displayed to the left on the application execution screen 340. For example, the application execution screen 340 displays the map corresponding to the left region of the application execution screen 320.

In the normal mode, the gesture sensed on the touch screen 190 is sent to the application. The application outputs an event corresponding to the sensed gesture (detected) in step S209. For example, if the event corresponding to the sensed (e.g., detected) gesture is a change in the display screen, the electronic device 100 may project and display the changed screen 350 on the touch screen 190. Moreover, the electronic device 100 may also project the changed screen. According to exemplary embodiments of the present invention, the display screen change as the event corresponding to the sensed (e.g., detected) gesture is merely an example, and the electronic device 100 may also output events in various forms, such as voice, light, vibration, or the like, to correspond to the sensed (e.g., detected) gesture.

If the controller 110 determines that the electronic device 100 is operating in the touch screen pointer mode in step S207, then the controller 110 proceeds to step S211. For example, referring to FIG. 2, if the controller 110 sets the touch screen pointer mode, and the controller 110 proceeds to display the pointer corresponding to the gesture sensed (e.g., detected) on the touch screen 190.

Figure 3F:
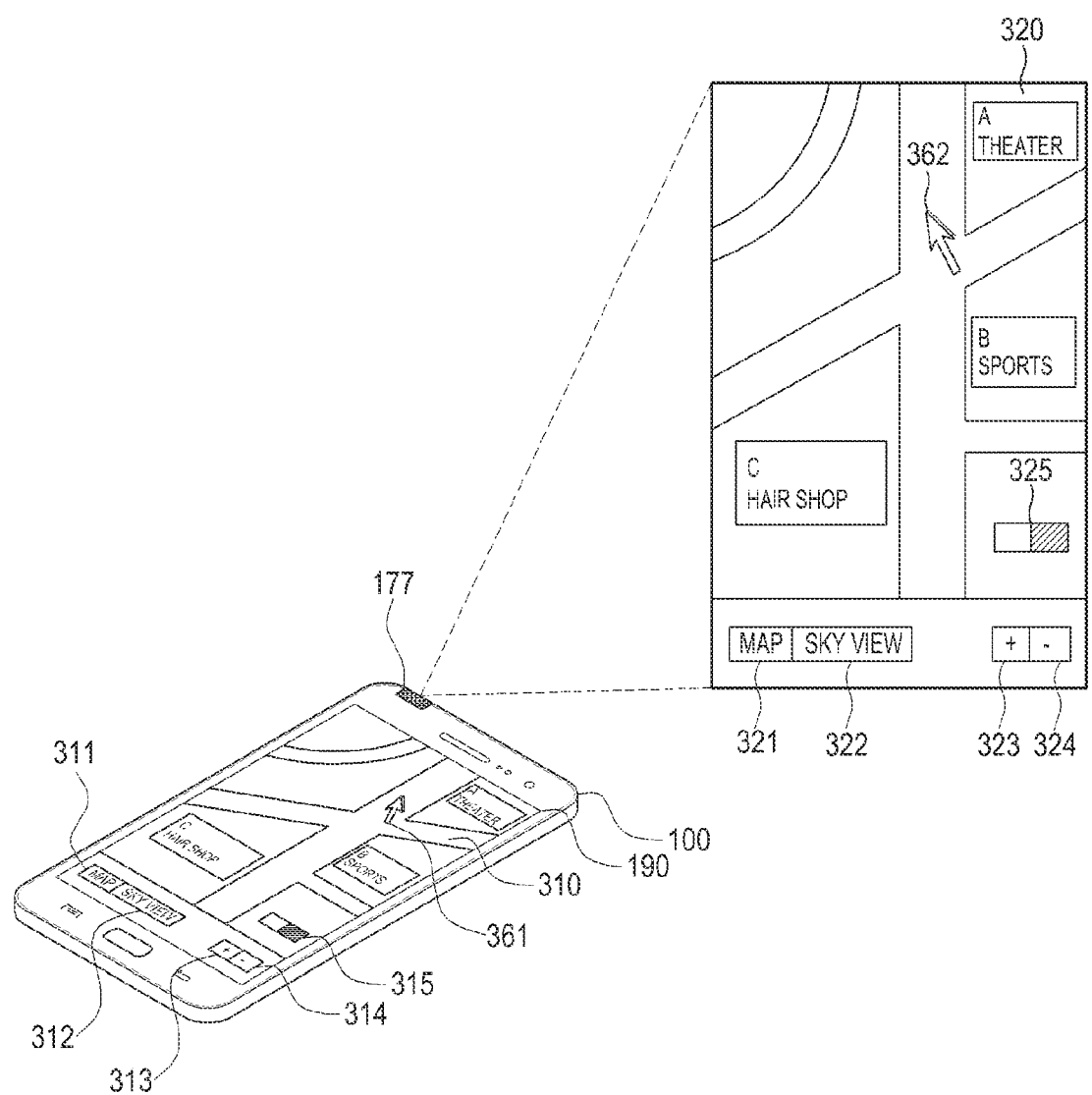

FIG. 3F is a conceptual diagram illustrating a case in which the toggling switch 315 is set to be positioned to the right according to an exemplary embodiment of the present invention.

Referring to FIG. 3F, when the toggling switch 315 is set to be positioned to the right, the touch screen pointer mode is set. Once the touch screen pointer mode is set, the controller 110 displays a pointer 361 on the application execution screen 310. The projector module 177 displays a projected pointer 362 corresponding to the pointer 361 on the projection image 320.

Figure 3G:
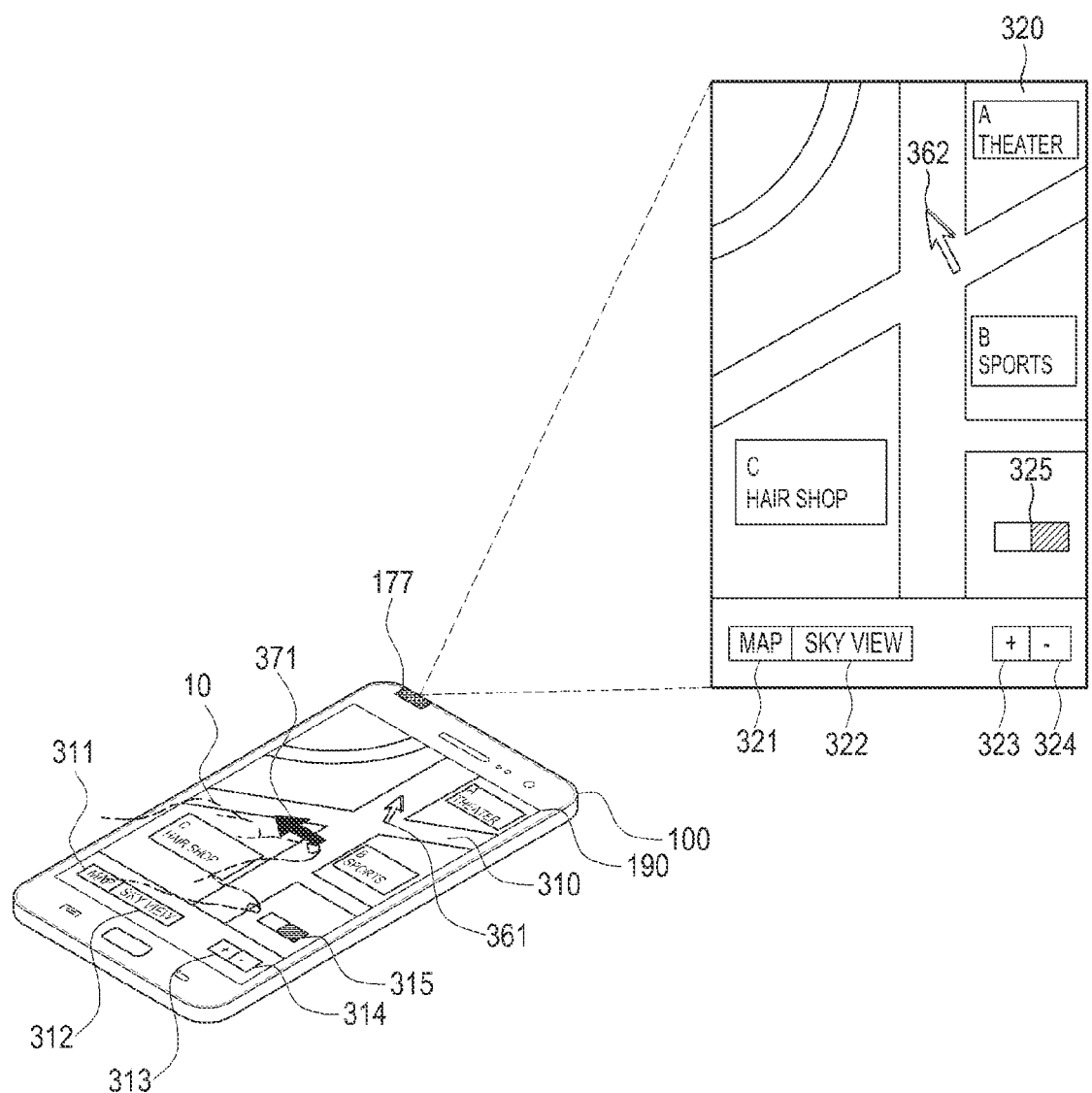

Referring to FIG. 3G, if the user 10 inputs a leftward continuous touch gesture 371 while the electronic device is operating in the touch screen pointer mode, then controller 110 intercepts the leftward continuous touch gesture 371 sensed (e.g., detected) on the touch screen 190 and thus does not dispatch the continuous touch gesture 371 to the map application. The controller 110 moves and displays the pointer 361 to correspond to the leftward continuous touch gesture 371. For example, rather than panning the map displayed by the map application according to a leftward continuous touch gesture 371 when the electronic device 100 is operating in a normal mode, if the electronic device 100 is operating in the touch screen pointer mode, the controller 110 moves the pointer 361 according to the leftward continuous gesture 371.

Figure 3H:
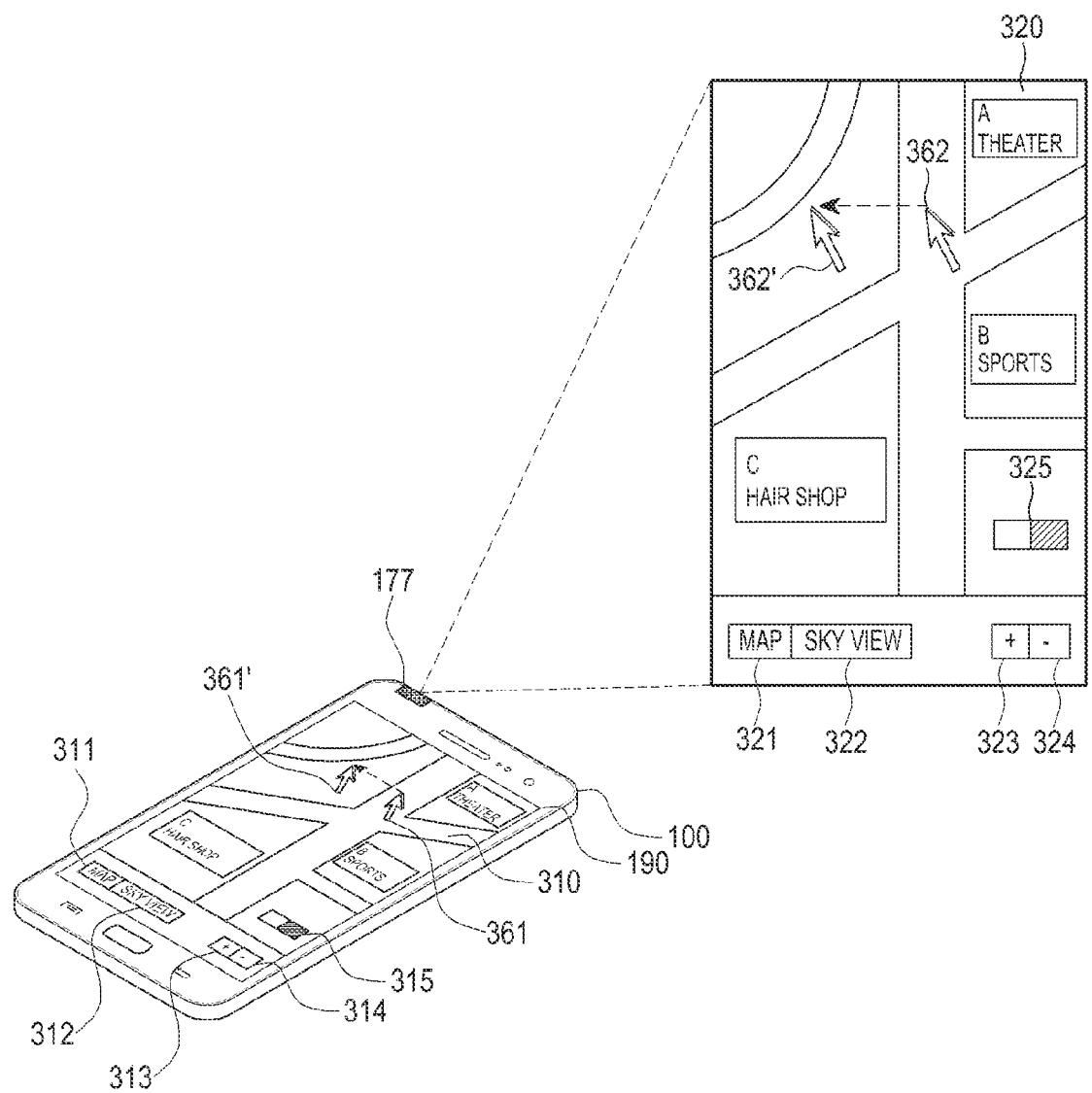

As illustrated in FIG. 3H, the controller 110 controls the touch screen 190 to move the pointer 361 to the left and displays the pointer 361' to correspond to the leftward continuous touch gesture 371. The controller 110 controls the projector module 177 to move the projected pointer 362 to the left and displays the projected pointer 362'. In particular, because the leftward continuous touch gesture 371 is not dispatched to the map application, the application execution screen 310 and the projection image 320 do not change.

Thus, if the user 10 desires to select a particular point on the map and inform another user of the selected point during presentation, the touch screen pointer mode may be set to move the pointer 361. When the user 10 desires to move a point displayed on the map to the right, the toggling switch 315 may be moved to the left to set the normal mode. The user 10 may perform manipulation for displaying the map corresponding to the right region by inputting the leftward continuous touch gesture in the normal mode. The user 10 may also move the toggling switch 315 back to the right (e.g., to set the electronic device 100 to the touch screen pointer mode) to generate the pointer 361 and may perform manipulation for moving the pointer 361 to a desired point.

Figure 3I:
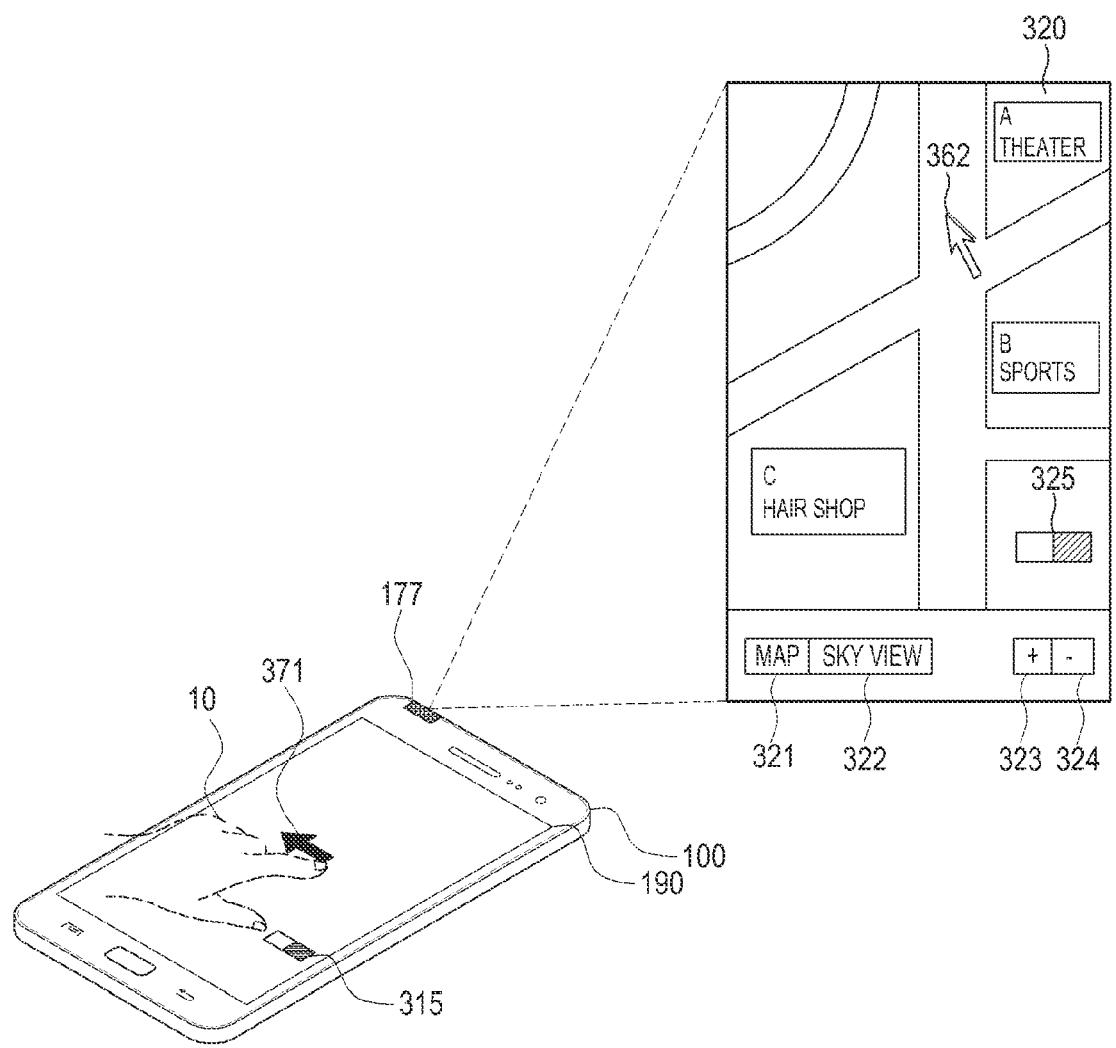

FIG. 3I is a conceptual diagram illustrating the electronic device according to an exemplary embodiment of the present invention.

Referring to FIG. 3I, when the touch screen pointer mode is set, only the toggling switch 315 may be displayed on the touch screen 190. Also if the touch screen pointer mode is activated, then the touch screen may be inactivated to save a battery. For example, according to exemplary embodiments of the present invention, the projector module 177 may display the application execution screen 320, while the touch screen 190 does not display a corresponding application execution screen. Rather, the touch screen 190 may display the toggling switch 315 and/or another screen.

Figure 4A:
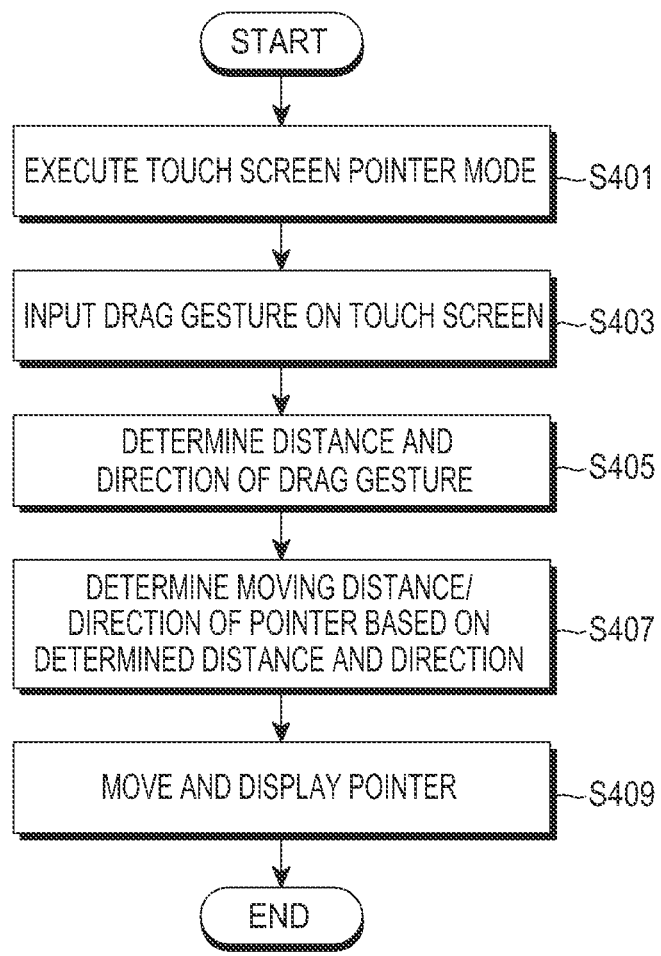
FIGS. 4A and 4B are flowcharts illustrating a method for controlling an electronic device according to exemplary embodiments of the present invention.
Figure 4B:
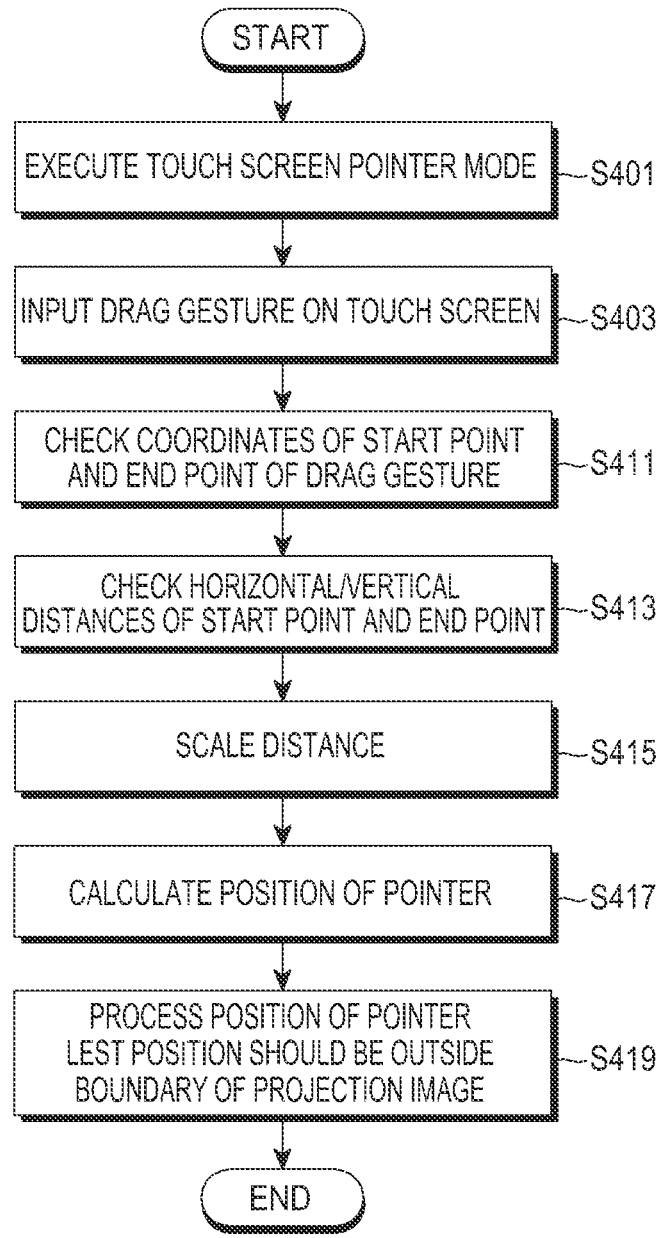

FIGS. 4A and 4B are flowcharts illustrating a method for controlling an electronic device according to exemplary embodiments of the present invention.

Referring to FIG. 4A, in step S401, the electronic device executes the touch screen pointer mode.

In step S403, the electronic device senses (e.g., detects) a continuous touch gesture which is input to the touch screen.

In step S405, the electronic device determines the distance and direction of the sensed (e.g., detected) continuous touch gesture.

In step S407, the electronic device determines the moving distance and direction of the pointer based on the determined distance and direction. For example, the electronic device determines a position to which the pointer is to be moved (or the pointer's position after movement).

In step S409, the electronic device moves and displays the pointer to the determined position.

Referring to FIG. 4B, in step S401, the electronic device executes the touch screen pointer mode in step S401.

In step S403, the electronic device senses (e.g., detects) a continuous touch gesture which is input to the touch screen.

In step S411, the electronic device determines coordinates on the touch screen, which correspond to a start point and an end point of the continuous touch gesture.

For example, the coordinates of the start point on the touch screen may correspond to (tx1, ty) and the coordinates of the end point on the touch screen may correspond to (tx2, ty2). Herein, tx1 and tx2 correspond to horizontal positions, ty1 and y2 correspond to vertical positions, and each value is determined on a pixel basis.

The start point of the continuous touch gesture may be a point at which a down gesture is input. The down gesture may be a touch on the touch screen by a user's finger or a coordinate designating device. The end point of the continuous touch gesture may be a point corresponding to an up gesture. The up gesture may be removal of the touch of the user's finger or the coordinate designating device from the touch screen. A gesture for moving the coordinates of the touch point between the up gesture and the down gesture may be called a move gesture.

In step S413, the controller 110 calculates a horizontal distance dX and a vertical distance dY based on the coordinates of the start point and the end point of the continuous touch gesture in step S413. The controller 110 may calculate the horizontal distance dX and the vertical distance dY by using Equation 1:

$$dX = tx1 - tx2$$

$$dY = ty1 - ty2 \quad \text{Equation (1)}$$

In step S415, the controller 110 scales a distance based on a scale factor. For example, a horizontal scale factor may correspond to stX and a vertical scale factor may correspond to stY. According to exemplary embodiments of the present invention, the controller 110 may scale a pointer's moving distance by using Equation 2:

$$PdX = dX * stX$$

$$PdY = dY * stY \quad \text{Equation (2)},$$

In Equation (2), Pdx indicates a horizontal moving distance of the scaled pointer and Pdy indicates a vertical moving distance of the scaled pointer. stX is a result of dividing a width of a projector screen by a width of a touch screen, and stY is a result of dividing a height of the projector screen by a height of the touch screen.

In step S417, the controller 110 calculates the position to which the pointer is to be moved. For example, the controller 110 may calculate the pointer's position after movement by using Equation 3:

$$pX2 = pX1 + PdX$$

$$pY2 = pY1 + PdY \quad \text{Equation (3)}$$

In Equation (3), pX1 and pY1 indicate horizontal and vertical coordinates of the position of the pointer prior to movement. pX2 and pY2 indicate horizontal and vertical coordinates of the position of the pointer after movement.

In step S419, the controller 110 processes the calculated pointer's position (pX2, pY2) lest the position (pX2, pY2) should be outside a boundary of the projection image. For example, it is assumed that the horizontal direction coordinates of the projection image are set to bx0 and bx1 and the vertical direction coordinates of the projection image are set to by0 and by1. The controller 110 may process the calculated pointer's position (pX2, pY2) lest the position (pX2, pY2) should be outside the boundary of the projection image by using Equation (4):

If $pX2 < bx0$ then $pX2 = bx0$

If $pY2 < by0$ then $pY2 = by0$

If $pX2 > bx1$ then $pX2 = bx1$

If $pY2 > by1$ then $pY2 = by1$ \quad Equation (4)

For example, if the pointer's position after movement is determined to be outside the boundary of the projection image, the controller 110 may process the pointer's position after movement such that the position is in the boundary of the projection image.

The controller 110 determines the pointer's position (pX2, pY2) according to the foregoing process, and controls the projector module 177 to display the pointer in the determined position on the projection image.

Figure 5:
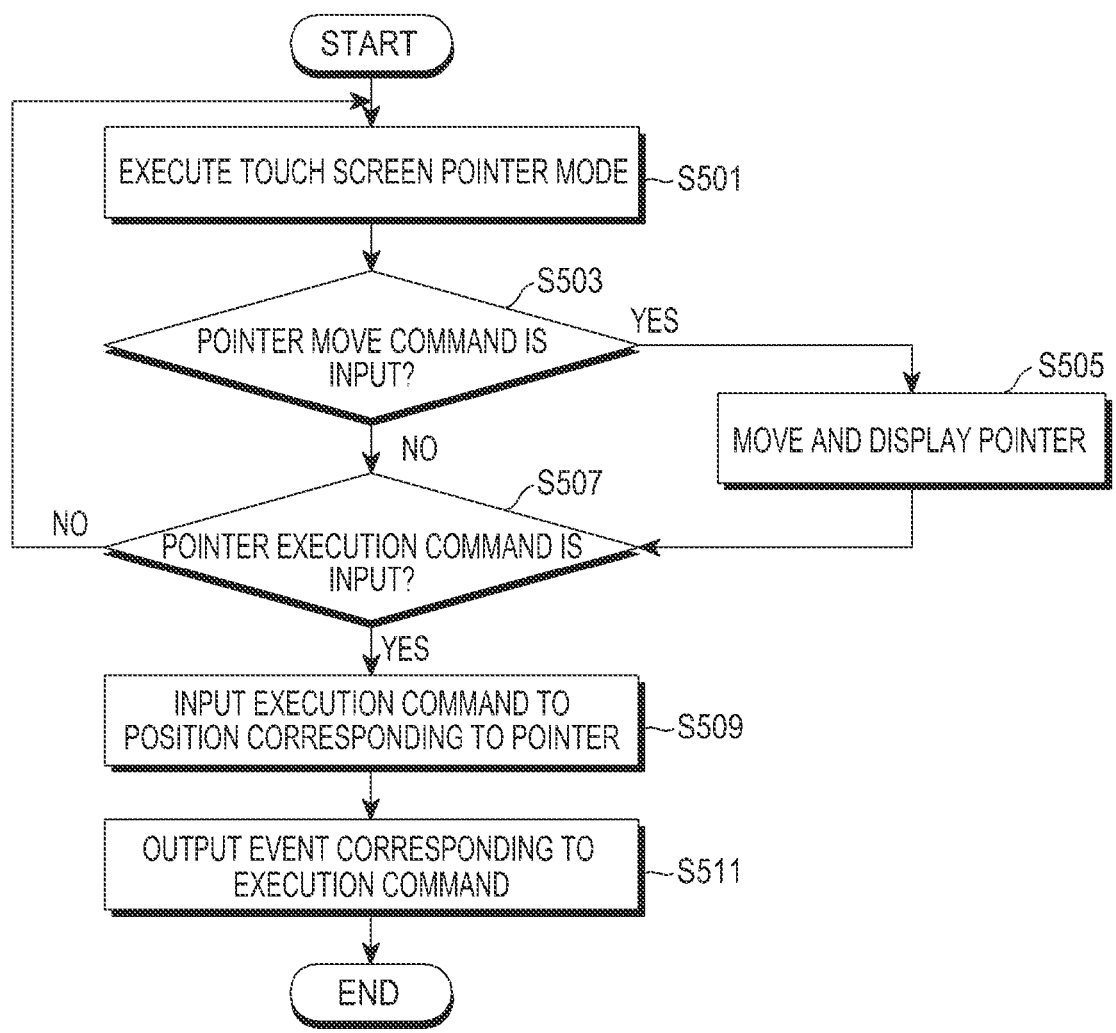
FIG. 5 is a flowchart illustrating a method for controlling an electronic device according to an exemplary embodiment of the present invention.
Figure 6A:
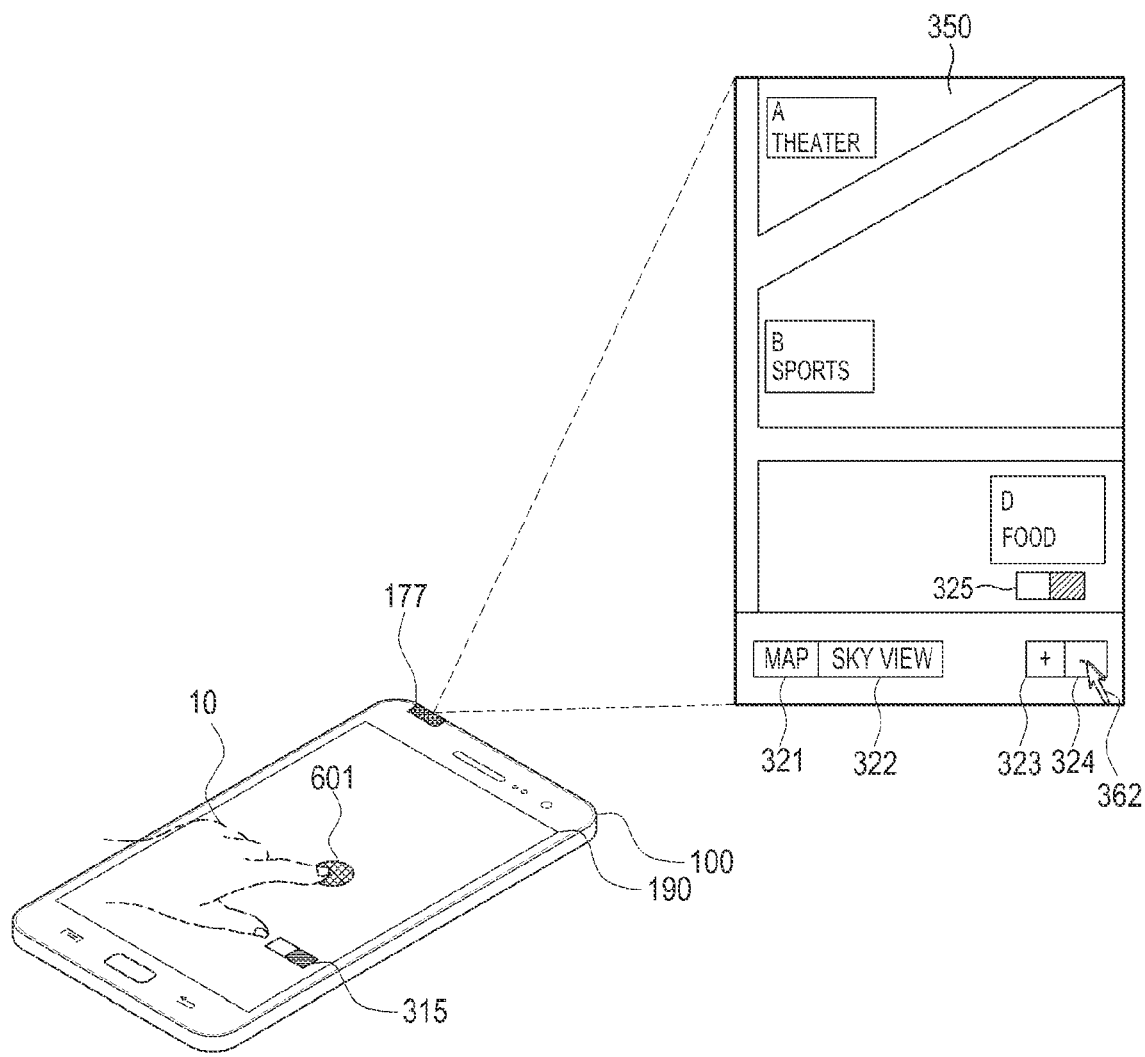
FIGS. 6A and 6B are conceptual diagrams illustrating an electronic device according to an exemplary embodiment of the present invention.
Figure 6B:
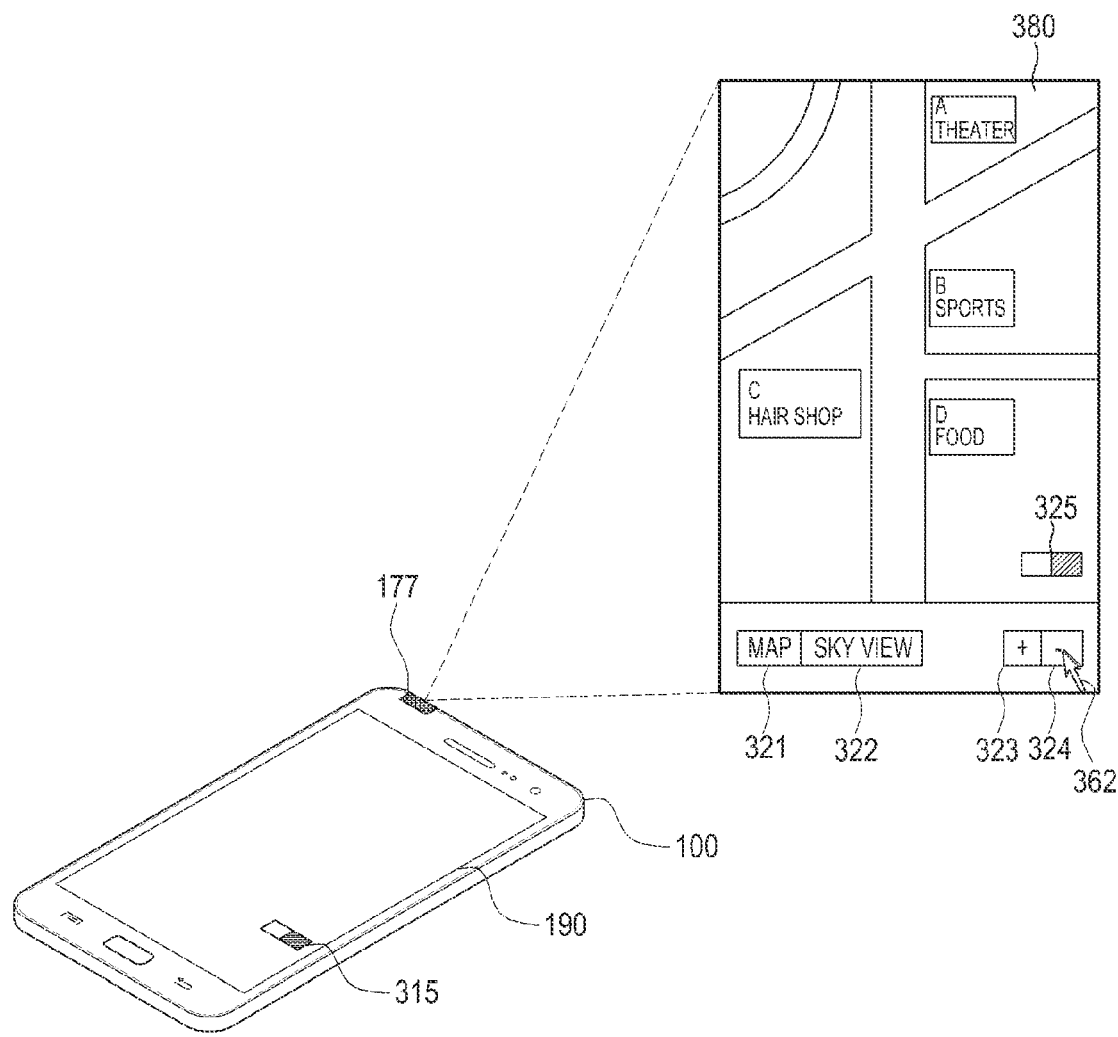

FIG. 5 is a flowchart illustrating a method for controlling an electronic device according to an exemplary embodiment of the present invention. FIGS. 6A and 6B are conceptual diagrams illustrating an electronic device according to an exemplary embodiment of the present invention.

Referring to FIG. 5, the control method will be described in detail with reference to FIGS. 6A and 6B.

In step S501, the electronic device executes the touch screen pointer mode.

In step S503, the electronic device determines whether a pointer move command is input.

If the electronic device determines that a pointer move command is input (e.g., if the electronic device senses (e.g., detects) a pointer move command that is input to the touch screen) in step S503, then the electronic device proceeds to step S505. As an example, if the electronic device senses (e.g., detects) a continuous touch gesture from a first point to a second point on the touch screen, then the electronic device may determine that a pointer move command is input. In step S505, the electronic device moves the pointer and displays on the projection image in response to the pointer move command, without sending the pointer move command to the currently executed application.

In contrast, if the electronic device determines that a pointer move command is not input in step S503, then the electronic device proceeds to step S507 in which the electronic device determines whether a pointer execution command is input. If the electronic device determines that a pointer execution command is input in step S507 (e.g., if electronic device senses a pointer execution command on the touch screen), then the electronic device proceeds to step S509. For example, as illustrated in FIG. 6A, the user 10 may sense a touch gesture 601 on the touch screen.

In step S509, the electronic sends dispatches the pointer execution command to the currently executed application to input the execution command to a position corresponding to the pointer (e.g., a fourth projection function key 324). In other words, even if the touch screen pointer mode is set, when the pointer execution command is sensed (e.g., detected), the pointer execution command may be sent to the currently executed application. To input the execution command to the particular application, the user 10 may experience the inconvenience of performing manipulation for setting the normal mode and inputting the execution command. Hence, the electronic device may be set to send the pointer execution command to the currently executed application if the pointer execution command is sensed (e.g., detected). As illustrated in FIG. 6A, the pointer 362 is positioned over the fourth projection function key 324. Accordingly, if a pointer execution command is detected, the electronic device executes a command corresponding to the fourth projection function key.

In step S511, the electronic device outputs an event corresponding to the execution command. For example, the electronic device may output an event of a fourth function key 314 corresponding to the fourth projection function key 324. For example, as illustrated in FIG. 6B, the electronic device may reduce and display a map to correspond to the fourth function key 314. In FIG. 6B, the reduced map 380 including "A Theater", "B Sports", "C Hair Shop", and "D Food" is displayed.

As discussed above, even if the touch screen pointer mode is set, when the pointer execution command is sensed (e.g., detected), the pointer execution command is dispatched to the currently executed application, thus maximizing user convenience.

Figure 7A:
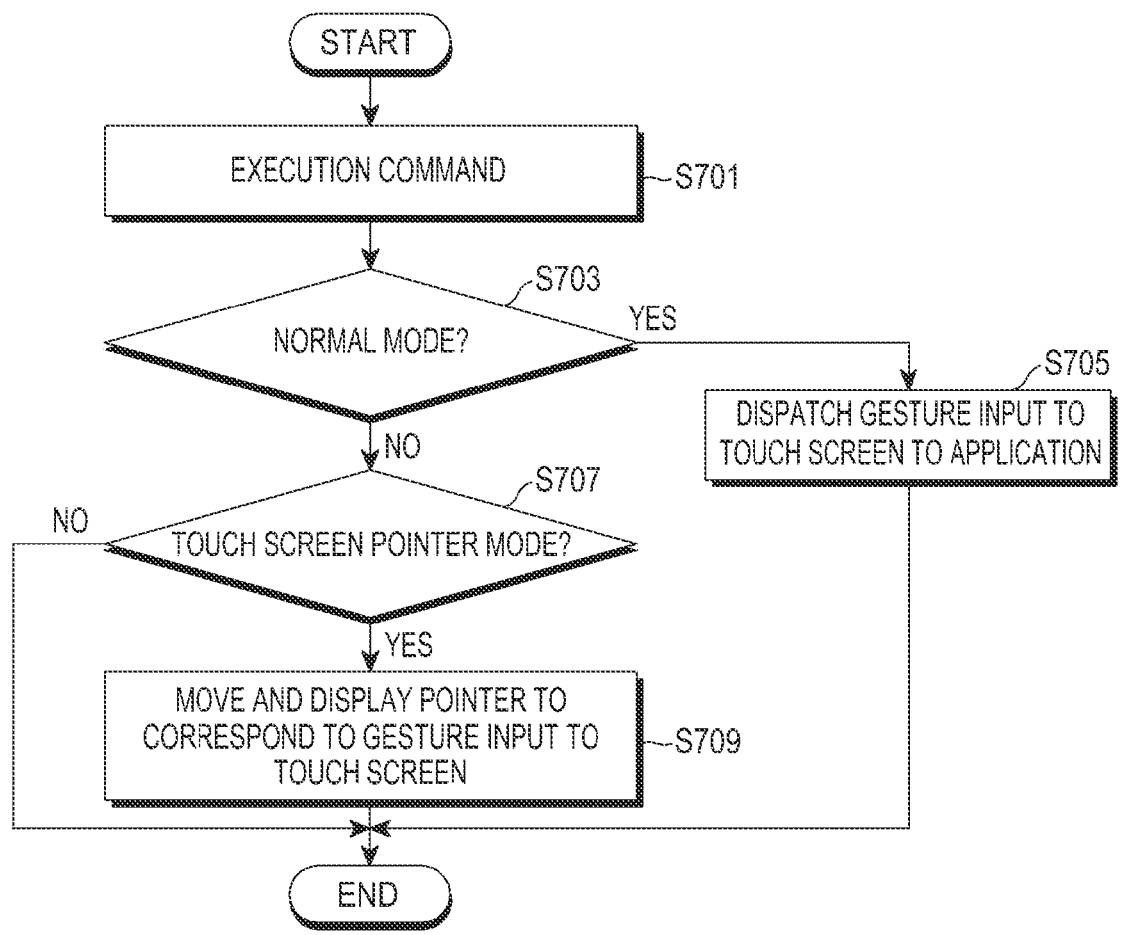
FIGS. 7A and 7B are flowcharts illustrating a method for controlling an electronic device according to exemplary embodiments of the present invention.
Figure 7B:
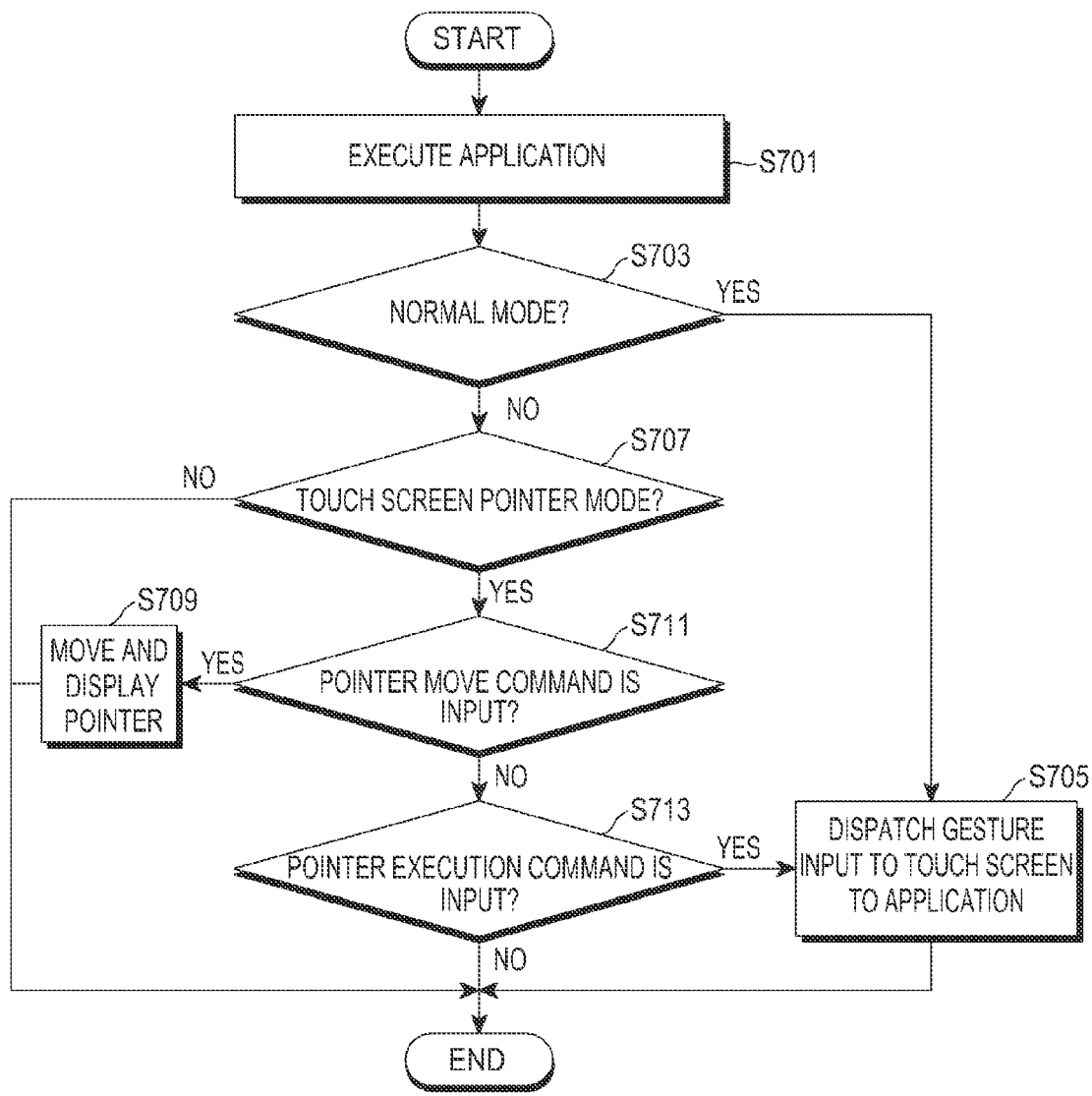

FIGS. 7A and 7B are flowcharts illustrating a method for controlling an electronic device according to exemplary embodiments of the present invention.

Referring to FIG. 7A, in step S701, the electronic device executes an application.

In step S703, the electronic device determines whether the electronic device is set to the normal mode.

If the electronic device determines that the electronic device is set to the normal mode in step S703, then the electronic device proceeds to step S705 in which the electronic device dispatches a gesture sensed (e.g., detected) on the touch screen to the currently executed application.

In contrast, if the electronic device determines that the electronic device is not set to the normal mode in step S703, then the electronic device proceeds to step S707 in which the electronic device determines whether the electronic device is set to the touch screen pointer mode.

If the electronic device determines that the electronic device is set to the touch screen pointer mode in step S707, then the electronic device proceeds to step S709 in which the electronic device moves and displays the pointer to correspond to the gesture sensed on the touch screen.

In contrast, if the electronic device determines that the electronic device is not set to the touch screen pointer mode in step S707, then the electronic device may terminate the procedure.

Referring to FIG. 7B, in step S701, the electronic device executes the application. Steps S701 through S707 have been described with reference to FIG. 7A, and thus will not be described at this time.

If the electronic device determines that the electronic device is set to the touch screen pointer mode in step S707, then the electronic device proceeds to step S711 in which the electronic device may determine whether a sensed (e.g., detected) command corresponds to a pointer move command or a pointer execution command. For example, if a continuous touch gesture is sensed (e.g., detected), the electronic device may determine that the sensed (e.g., detected) command corresponds to the pointer move command. If the touch gesture is sensed (e.g., detected), the electronic device may determine that the sensed (e.g., detected) command corresponds to the pointer execution command.

If the electronic device determines that a sensed (e.g., detected) command corresponds to the pointer move command in step S711, then the electronic device proceeds to step S709 in which the electronic device does not send the sensed (e.g., detected) pointer move command to the application and moves and displays the pointer in step S709.

In contrast, if the electronic device determines that a sensed (e.g., detected) command does not correspond to the pointer move command in step S711, then the electronic device proceeds to step S713 in which the electronic device determines whether a sensed (e.g., detected) command corresponds to a pointer execution command.

If the electronic device determines that the sensed (e.g., detected) command corresponds the pointer execution command in step S713, then the electronic device proceeds to step S705 in which the electronic device sends the detected pointer execution command to the application in. The electronic device may input the execution command to a portion of the touch screen corresponding to a point in which the pointer is positioned.

In contrast, if the electronic device determines that the sensed (e.g., detected) command does not correspond the pointer execution command in step S713, then the electronic device may terminate the procedure.

Figure 8A:
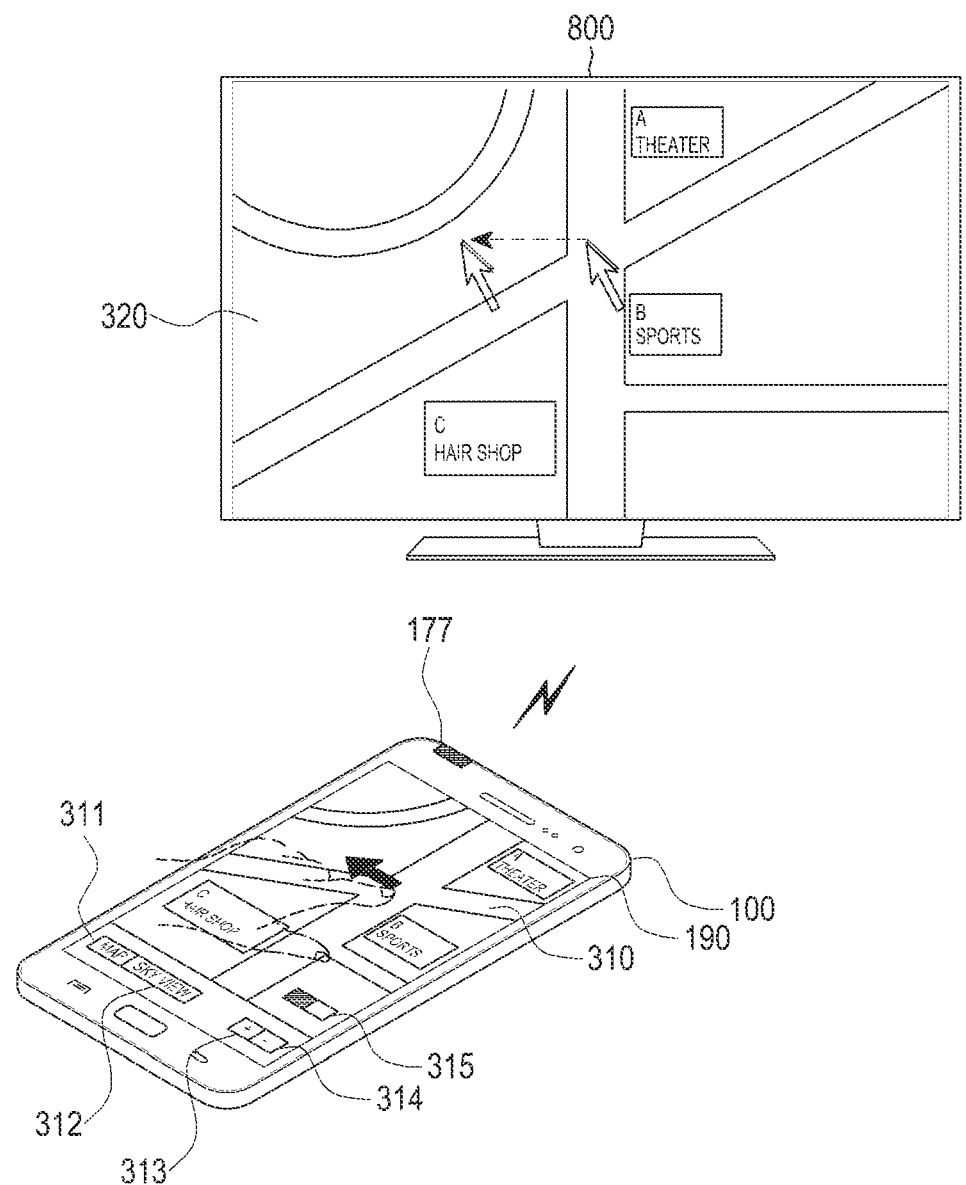
FIGS. 8A and 8B are conceptual diagrams illustrating an electronic device according to exemplary embodiments of the present invention.
Figure 8B:
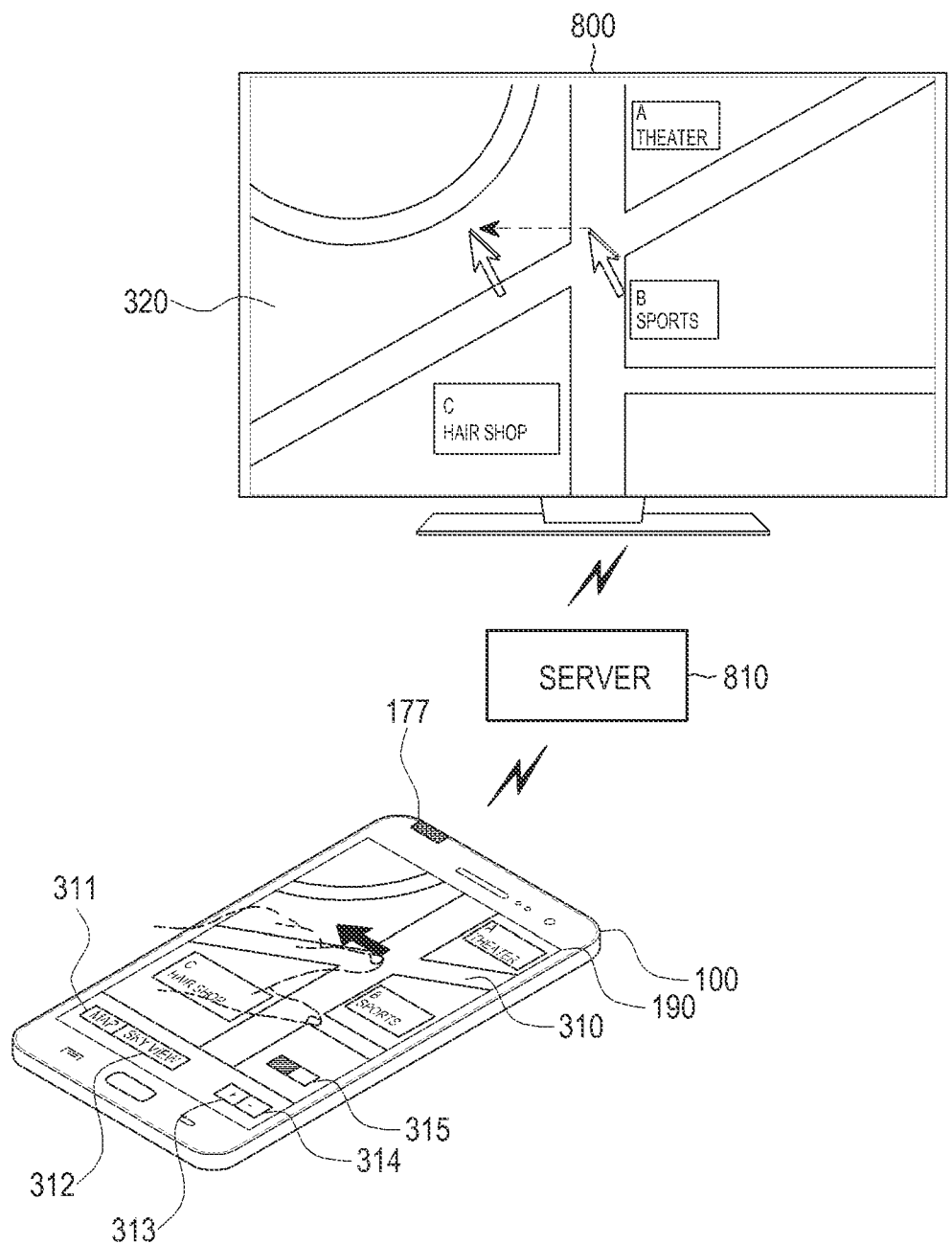

FIGS. 8A and 8B are conceptual diagrams illustrating the electronic device according to exemplary embodiments of the present invention.

Referring to FIG. 8A, the electronic device 100 performs communication with an external device 800. The electronic device 100 may perform data transmission and reception with the external device 800, for example, based on Bluetooth, infrared communication, Zig-bee communication, and/or the like. The electronic device 100 transmits a displayed screen 310 to the external device 800. The external device 800 displays a received screen 320. The user may input the pointer move command, such as a continuous touch gesture, to the touch screen 190 of the electronic device 100. The electronic device 100 may determine the pointer's position based on the sensed (e.g., detected)

pointer move command. The electronic device 100 displays the pointer on the screen 310 and transmits the pointer-displayed screen 310 to the external device 800. The external device 800 displays the received pointer-displayed screen 320. For example, the electronic device 100 may detect a gesture and based on the detected gesture, may determine the pointer's position, and may send, to the external device 800, information corresponding to a displayed screen and applicable pointer position information.

Referring to FIG. 8B, the electronic device 100 may also transmit and receive data with the external device 800 through relay of a server 810. Thus, even when the electronic device 100 is located remotely from the external device 800, the electronic device 100 may transmit the pointer-displayed screen to the external device 800 in response to the pointer move command sensed (e.g., detected) on the touch screen 190.

Figure 9:
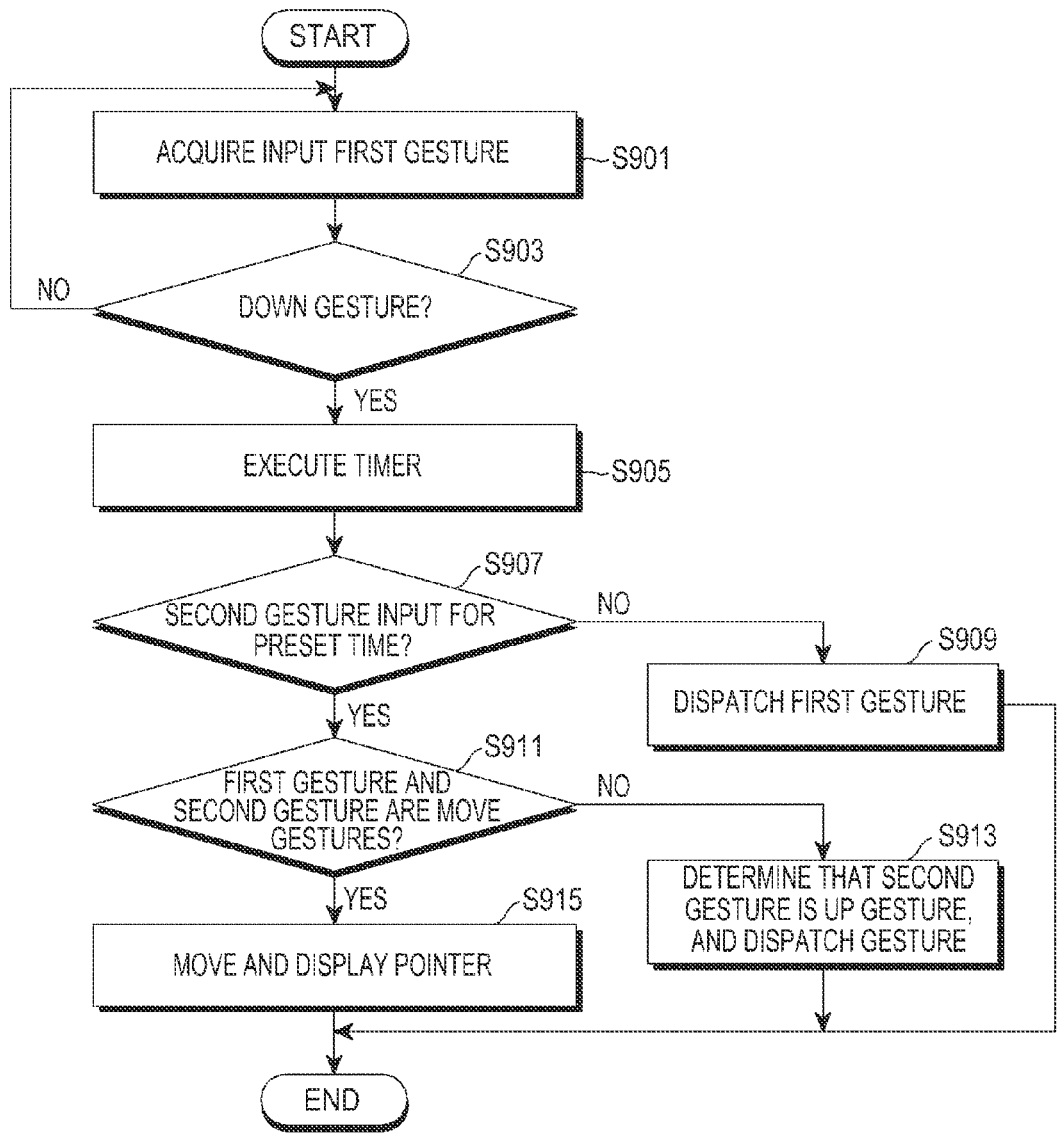
FIG. 9 is a flowchart illustrating a method for controlling an electronic device according to an exemplary embodiment of the present invention.

FIG. 9 is a flowchart illustrating a method for controlling an electronic device according to an exemplary embodiment of the present invention. When the electronic device acquires an input gesture, the input gesture is emulated according to position of the pointer. The input gesture corresponds to touch screen events. There are 3 types of touch screen events: down, move and up events. The down events means beginning of a gesture, and the move event means changing position of finger during the gesture, and the up event means finishing the gesture. The gesture can be further interpreted as a tap gesture, a long tap gesture or a drag gesture.

Referring to FIG. 9, in step S901, the electronic device acquires an input first gesture.

In step S903, the electronic device determines whether the input first gesture corresponds to a down gesture.

If the electronic device determines that the input first gesture does not correspond to a down gesture in step S903, then the electronic device proceeds to step S901.

If the electronic device determines that the input first gesture corresponds to a down gesture in step S903, then the electronic device proceeds to step S905 in which the electronic device executes a timer. Thereafter, the electronic device proceeds to step S907.

In step S907, the electronic device determines whether a second gesture is input within a preset time.

If the electronic device determines that a second gesture is not input within a preset time (e.g., if the timer is executed and a second gesture is not input within a preset time) in step S905, then the electronic device proceeds to step S909 in which the electronic device sends the sensed (e.g., detected) first gesture to a currently executed application. Then, the pointer execution command (S713) is activated. For example, when a user inputs a long tap gesture onto the touch screen, the electronic device is intercepting the touch screen events and the electronic device sends the event which was hold by interception to the application. Then, the application performs the action corresponding to the long tap gesture. Also when a user inputs a long tap gesture onto the touch screen, the electronic device changes touch coordinates into pointer coordinates. Then, the pointer execution command is activated. Additionally, the electronic device may generate a vibration through the vibration motor 164 to inform the user of whether the pointer execution command is activated.

If the electronic device determines that a second gesture is input within a preset time (e.g., if the timer is executed and the second gesture is input within the preset time) in step S905, then the electronic device proceeds to step S911 in which the electronic device determines whether the sensed first gesture and second gesture form a move gesture together.

If the electronic device determines that the first gesture and the second gesture form the move gesture together in step S911, then the electronic device proceeds to step S915 in which the electronic device may move and display the pointer to correspond to the move gesture. The electronic device may further move and display the pointer to correspond to subsequently input gestures. If the electronic device determines that the first gesture and the second gesture do not form the move gesture together in step S911, then the electronic device proceeds to step S913 in which the electronic device determines that the sensed (e.g., detected) second gesture is an up gesture, and sends the second gesture to the currently executed application.

According to various exemplary embodiments of the present invention, an electronic device including a projector for adding and displaying a pointer corresponding to a gesture sensed on a touch screen to a projected image and a method for controlling the electronic device may be provided.

Therefore, a user may easily manipulate a smart phone or a tablet PC while observing the projected image, such that user convenience may be maximized.

The above-described methods according to exemplary embodiments of the present invention can be implemented in hardware, firmware or as software or computer code that is stored on a non-transitory machine readable medium such as a Compact Disc (CD) ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an Application-Specific Integrated Circuit (ASIC) or Field-Programmable Gate Array (FPGA). As would be understood in the art, the computer, the processor, microprocessor controller or the programmable hardware include memory components (e.g., RAM, ROM, Flash, and the like) that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware. Under the broadest reasonable interpretation, the appended claims constitute statutory subject matter in compliance with 35 U.S.C. §101 and none of the elements correspond to software per se.

The terms "unit" or "module" as may be used herein is to be understood as constituting hardware such as a processor or microprocessor configured for a certain desired functionality in accordance with statutory subject matter under 35 U.S.C. §101 and does not constitute software per se.

The electronic device may receive and store a program including machine executable code that is loaded into hardware such as a processor and executed to configure the hardware, and the machine executable code may be provided from an external device connected in a wired or wireless manner. The device providing the machine executable code can include a non-transitory memory for storing the machine executable code that when executed by a process will instruct the electronic device to execute the claimed method for controlling the electronic device, information necessary for the method for controlling the electronic device, and so forth, a communication unit for performing wired or wireless communication with the portable terminal, and a controller for transmitting a corresponding program to the electronic device at the request of the electronic device or automatically.

While the invention has been shown and described with reference to exemplary embodiments thereof, it will be understood by those skilled in the art that various changes in form and detail may be made therein without departing from the spirit and scope of the invention as defined by the appended claims and their equivalents.

What is claimed is:

1. A method for controlling an electronic device which executes and displays an application, the method comprising:
    displaying an execution screen of the application on a touch screen;
    projecting a projection image corresponding to the execution screen of the application;
    receiving, through a touchscreen of the electronic device, a user input; and
    processing the user input differently according to a mode of the electronic device,
    wherein the mode of the electronic device comprises a normal mode and a touch screen pointer mode,
    wherein the processing of the user input differently comprises:
        displaying a pointer on the projection image,
        moving the pointer based on the user input, if the mode of the electronic device is the touch screen pointer mode, and
        removing the pointer on the projection image and controlling the user input to be used by the application, if the mode of the electronic device is the normal mode,
    wherein the user input corresponds to a continuous touch gesture from a first point to a second point on the touch screen, and
    wherein the moving of the pointer based on the user input comprises determining a distance and a direction of the continuous touch gesture and determining a position of the pointer after movement based on the determined distance and direction.

2. The method of claim 1, wherein the moving of the pointer based on the user input comprises:
    intercepting, when in the touch screen pointer mode, the received user input so as to not send the received user input to the application.

3. The method of claim 1, wherein the moving of the pointer based on the user input further comprises:
    determining a distance from the first point to the second point on the touch screen.

4. The method of claim 3, wherein the moving of the pointer based on the user input further comprises:
    scaling the determined distance based on a scale factor associated with a ratio between the touch screen and the projection image.

5. The method of claim 4, wherein the moving of the pointer based on the user input further comprises:
    calculating a position of the pointer after movement, based on the scaled distance.

6. The method of claim 1, further comprising:
    displaying a toggle switch for toggling between the touch screen pointer mode and the normal mode.

7. The method of claim 6, wherein if the toggle switch is set to the normal mode, the received user input is used by the application.

8. The method of claim 1, wherein if the received user input is a pointer execution command, an execution command is input to a portion corresponding to the pointer on the projection image.

9. An electronic device comprising:
    a touch screen configured to display an execution screen of an application and receive a user input;
    a projector configured to project a projection image corresponding to the execution screen of the application; and
    at least one processor configured to:
        process the user input differently according to a mode of the electronic device that includes a normal mode and a touch screen pointer mode,
        display a pointer on the projection image and move the pointer based on the user input, if the mode of the electronic device is the touch screen pointer mode, and
        remove the pointer on the projection image and control the user input to be used by the application, if the mode of the electronic device is the normal mode,
    wherein the user input corresponds to a continuous touch gesture from a first point to a second point on the touch screen, and
    wherein the at least one processor is further configured to determine a distance and a direction of the continuous touch gesture and determine a position of the pointer after movement based on the determined distance and direction.

10. The electronic device of claim 9, wherein the at least one processor is further configured to intercept, when in the touch screen pointer mode, the received user input such that the received user input is not sent to the application.

11. The electronic device of claim 9, wherein the at least one processor is further configured to determine a distance from the first point to the second point on the touch screen.

12. The electronic device of claim 11, wherein the at least one processor is further configured to scale the determined distance based on a scale factor associated with a ratio between the touch screen and the projection image.

13. The electronic device of claim 12, wherein the at least one processor is further configured to calculate a position of the pointer after movement, based on the scaled distance.

14. The electronic device of claim 9, wherein the at least one processor is further configured to display a toggle switch configured to toggle between the touch screen pointer mode and the normal mode.

15. The electronic device of claim 14, wherein when the toggle switch is set to the normal mode, the received user input is used by the application.

16. The electronic device of claim 9, wherein when the received user input is a pointer execution command, the at least one processor is further configured to input an execution command to a portion corresponding to the pointer on the projection image.

17. A non-transitory computer-readable storage medium storing instructions that, when executed, cause at least one processor to perform the method of claim 1.

* * * * *